(12) United States Patent
Tagami et al.

(10) Patent No.: US 11,978,935 B2
(45) Date of Patent: May 7, 2024

(54) APPARATUS AND SYSTEM FOR GENERATING NITROGEN GAS THROUGH DEHUMIDIFYING AND FILTERING FUEL CELL EXHAUST GAS

(71) Applicant: MICRO CONTROL SYSTEMS LTD., Saku (JP)

(72) Inventors: Katsumichi Tagami, Saku (JP); Soichi Hashiba, Saku (JP); Takeshi Kitazawa, Saku (JP); Noboru Fujii, Saku (JP)

(73) Assignee: MICRO CONTROL SYSTEMS LTD., Saku (JP)

( * ) Notice: Subject to any disclaimer, the term of this patent is extended or adjusted under 35 U.S.C. 154(b) by 271 days.

(21) Appl. No.: 17/617,870

(22) PCT Filed: Feb. 22, 2021

(86) PCT No.: PCT/JP2021/006587
§ 371 (c)(1),
(2) Date: Dec. 9, 2021

(87) PCT Pub. No.: WO2021/172260
PCT Pub. Date: Sep. 2, 2021

(65) Prior Publication Data
US 2022/0311035 A1 Sep. 29, 2022

(30) Foreign Application Priority Data

Feb. 25, 2020 (JP) .................................. 2020-029364
Jan. 26, 2021 (JP) .................................. 2021-010474

(51) Int. Cl.
*H01M 8/0662* (2016.01)
*B01D 53/22* (2006.01)
(Continued)

(52) U.S. Cl.
CPC ........ *H01M 8/0662* (2013.01); *B01D 53/227* (2013.01); *B01D 53/26* (2013.01);
(Continued)

(58) Field of Classification Search
CPC ........... H01M 8/0662; H01M 8/04164; H01M 8/04753; B01D 53/227; B01D 53/26;
(Continued)

(56) References Cited

U.S. PATENT DOCUMENTS 4,690,695 A * 9/1987 Doshi .................. B01D 53/229
                                                          95/55
5,330,857 A    7/1994 Sederquist et al.
(Continued)

FOREIGN PATENT DOCUMENTS

JP       S63-151602 A    6/1988
JP       H06-007752 A    1/1994
(Continued)

OTHER PUBLICATIONS

May 18, 2021 Search Report issued in International Patent Application No. PCT/JP2021/006587.
(Continued)

*Primary Examiner* — Matthew J Merkling
(74) *Attorney, Agent, or Firm* — Oliff PLC

(57) ABSTRACT

An apparatus/system for generating a high-purity nitrogen gas using a fuel cell includes; a fuel cell that operates by taking in air or a gas containing nitrogen and oxygen, and a fuel gas; a dehumidification mechanism that reduces moisture or water vapor content in an exhaust gas that is extracted from the fuel cell and has a lower oxygen concentration than air; and a filtering mechanism which includes a filter using fibers having different degrees of permeation for nitrogen and oxygen and converts the exhaust gas having a reduced moisture or water vapor content into a gas having an (Continued)

increased nitrogen concentration. The filter recovery ratio is higher when an oxygen concentration of a gas to be filtered is lower. The dehumidification mechanism is a pump unit including a water seal pump to provide an adiabatic expansion chamber in which the exhaust gas extracted from the fuel cell expands adiabatically.

14 Claims, 10 Drawing Sheets

(51) Int. Cl.
 *B01D 53/26* (2006.01)
 *C01B 21/04* (2006.01)
 *H01M 8/04029* (2016.01)
 *H01M 8/04119* (2016.01)
 *H01M 8/04746* (2016.01)

(52) U.S. Cl.
 CPC ....... *C01B 21/045* (2013.01); *H01M 8/04029* (2013.01); *H01M 8/04164* (2013.01); *H01M 8/04753* (2013.01); *B01D 2053/224* (2013.01); *C01B 2210/0014* (2013.01); *C01B 2210/0062* (2013.01)

(58) Field of Classification Search
 CPC ............ B01D 2053/224; C01B 21/045; C01B 2210/0014; C01B 2210/0062
 See application file for complete search history.

(56) References Cited

U.S. PATENT DOCUMENTS

| | | | |
|---|---|---|---|
| 6,135,862 A | | 10/2000 | Ukai et al. |
| 2007/0048571 A1* | | 3/2007 | Sasaki ............... H01M 8/04552 |
| | | | 429/432 |
| 2008/0017029 A1* | | 1/2008 | Kase ..................... B01D 71/64 |
| | | | 96/10 |
| 2017/0341019 A1 | | 11/2017 | Rheaume et al. |

FOREIGN PATENT DOCUMENTS

| | | | |
|---|---|---|---|
| JP | 2000-044209 A | | 2/2000 |
| JP | 2008-108667 A | | 5/2008 |
| JP | 2009-161370 A | | 7/2009 |
| JP | 2013-114997 A | | 6/2013 |
| JP | 2013-233549 A | | 11/2013 |
| JP | 2016-149283 A | | 8/2016 |
| JP | 2016-164987 A | | 9/2016 |
| JP | 2017-084796 A | | 5/2017 |
| JP | 2018-163890 A | | 10/2018 |
| JP | 2019-129110 A | | 8/2019 |
| JP | 2020-149838 A | | 9/2020 |

OTHER PUBLICATIONS

Aug. 30, 2022 International Preliminary Report on Patentability issued in International Patent Application No. PCT/JP2021/006587.

* cited by examiner

APPARATUS AND SYSTEM FOR GENERATING NITROGEN GAS THROUGH DEHUMIDIFYING AND FILTERING FUEL CELL EXHAUST GAS

TECHNICAL FIELD

The present invention relates to a technology for generating a high-purity nitrogen gas.

BACKGROUND ART

Priority is claimed on Japanese Patent Application No. JP2020-029364 filed Feb. 25, 2020 and Japanese Patent Application No. JP2021-010474 field Jan. 26, 2021 under the Paris Convention, and the content of these Japanese Patent Application Publications is incorporated herein by reference under PCT Rule 20.6.

In recent years, the use of fuel cells has been actively promoted. For example, fuel cell vehicles have been put into practical use, and household and industrial fuel cell facilities have become available. When a fuel cell is used, not only can highly efficient power generation be realized, but also the amount of carbon dioxide discharged can be reduced to about zero unlike conventional power generation means using an internal combustion engine. Accordingly, fuel cell technology is expected to greatly contribute to realization of a carbon zero society.

The inventors of the present invention have focused on the potential of such a fuel cell, and invented a soldering apparatus using a fuel cell as described in PTL 1 and 2. In the soldering apparatus, not only electric power generated by the fuel cell but also an exhaust gas generated through power generation is supplied to the soldering apparatus and used.

In addition, as described in PTL 3 and 4, the inventors of the present invention have also invented a power generation apparatus using a fuel cell that supplies an inert gas and electric power to a processing apparatus that heats and processes an object to be heated in the inert gas with electric power. The power generation apparatus can remove or reduce the oxygen content, and water vapor content/moisture contained in an exhaust gas from the fuel cell, and can convert the exhaust gas into an inert gas suitable for use in the processing apparatus.

Further, as described in PTL 5, the inventors of the present invention have invented a power and gas supply apparatus in which N fuel cell parts from the first fuel cell part to the Nth fuel cell part are linked and oxygen deficient gas with a sufficiently small amount of oxygen can be supplied. In addition, as described in PTL 6, the inventors of the present invention have also invented a nitrogen gas generation apparatus in which air and a fuel gas having a pressure exceeding atmospheric pressure are supplied to a fuel cell, the fuel cell is operated, an exhaust gas having a pressure exceeding atmospheric pressure extracted from the fuel cell is applied to a nitrogen filter with a pressure exceeding atmospheric pressure, and a gas having an increased nitrogen concentration is extracted from the filter.

CITATION LIST

Patent Literature

[PTL 1] Japanese Patent Application Publication No. 2013-233549

[PTL 2] Japanese Patent Application Publication No. 2016-164987

[PTL 3] Japanese Patent Application Publication No. 2017-084796

[PTL 4] Japanese Patent Application Publication No. 2018-163890

[PTL 5] Japanese Patent Application Publication No. 2019-129110

[PTL 6] Japanese Patent Application Publication No. 2020-149838

SUMMARY OF INVENTION

Technical Problem

In this manner, the inventors of the present invention have come to the conclusion that it is possible to supply a high-purity nitrogen gas, for which there is a great demand in various production/service provision sites, by using a fuel cell.

Such a high-purity nitrogen gas is an inert gas that is neither combustion-supporting nor flammable, and is a very useful gas, and at present, it is currently produced from air as a raw material by a pressure swing adsorption (PSA) method, a cold air separation method, a membrane separation method or the like.

Here, it is thought that it would be possible to efficiently generate a high-purity nitrogen gas using an exhaust gas from a fuel cell without directly using air as a raw material as in conventional art. In addition, of course, since the fuel cell is used, electric power can be supplied as well as the high-purity nitrogen gas.

However, the exhaust gas extracted from the fuel cell generally contains a large amount of water ($H_2O$) generated by the reaction of the fuel cell, and the relative humidity thereof is about 100%. Therefore, if it is used without any modification, a harmful effect occurs when the subsequent high purification treatment is performed, and it becomes difficult to perform the treatment reliably and stably.

Here, an object of the present invention is to provide an apparatus, system and method for generating a high-purity nitrogen gas reliably and stably using a fuel cell.

Solution to Problem

According to the present invention, there are provided a nitrogen gas generation apparatus and a nitrogen gas generation system which include (A) a fuel cell that operates by taking in air or a gas containing nitrogen and oxygen, and a fuel gas, (B) a dehumidification mechanism that reduces moisture or water vapor content in an exhaust gas that is extracted from the fuel cell and has a lower oxygen concentration than air, and (C) a filtering mechanism which includes a filter using fibers having different degrees of permeation for nitrogen and oxygen and converts the exhaust gas having a reduced moisture or water vapor content into a gas having an increased nitrogen concentration. Here, the filter is preferably a filter in which a recovery ratio is higher when an oxygen concentration of a gas to be filtered is lower. In addition, the dehumidification mechanism is preferably a pump unit including a water seal pump, and in this case, it is preferable to provide an adiabatic expansion chamber in which the exhaust gas extracted from the fuel cell expands adiabatically.

According to the present invention, there is also provided a nitrogen gas generating method including a step of supplying air or a gas containing nitrogen and oxygen, and a fuel gas to a fuel cell and operating the fuel cell, a step of extracting an exhaust gas having a lower oxygen concentration than air from the fuel cell, a step of reducing a moisture or water vapor content in the extracted exhaust gas, and a step of applying the exhaust gas having a reduced moisture or water vapor content to a filter using fibers having different degrees of permeation for nitrogen and oxygen and extracting the exhaust gas having an increased nitrogen concentration from the filter.

Advantageous Effects of Invention

According to the present invention, it is possible to generate a high-purity nitrogen gas reliably and stably using a fuel cell.

DESCRIPTION OF EMBODIMENTS

Figure 1:
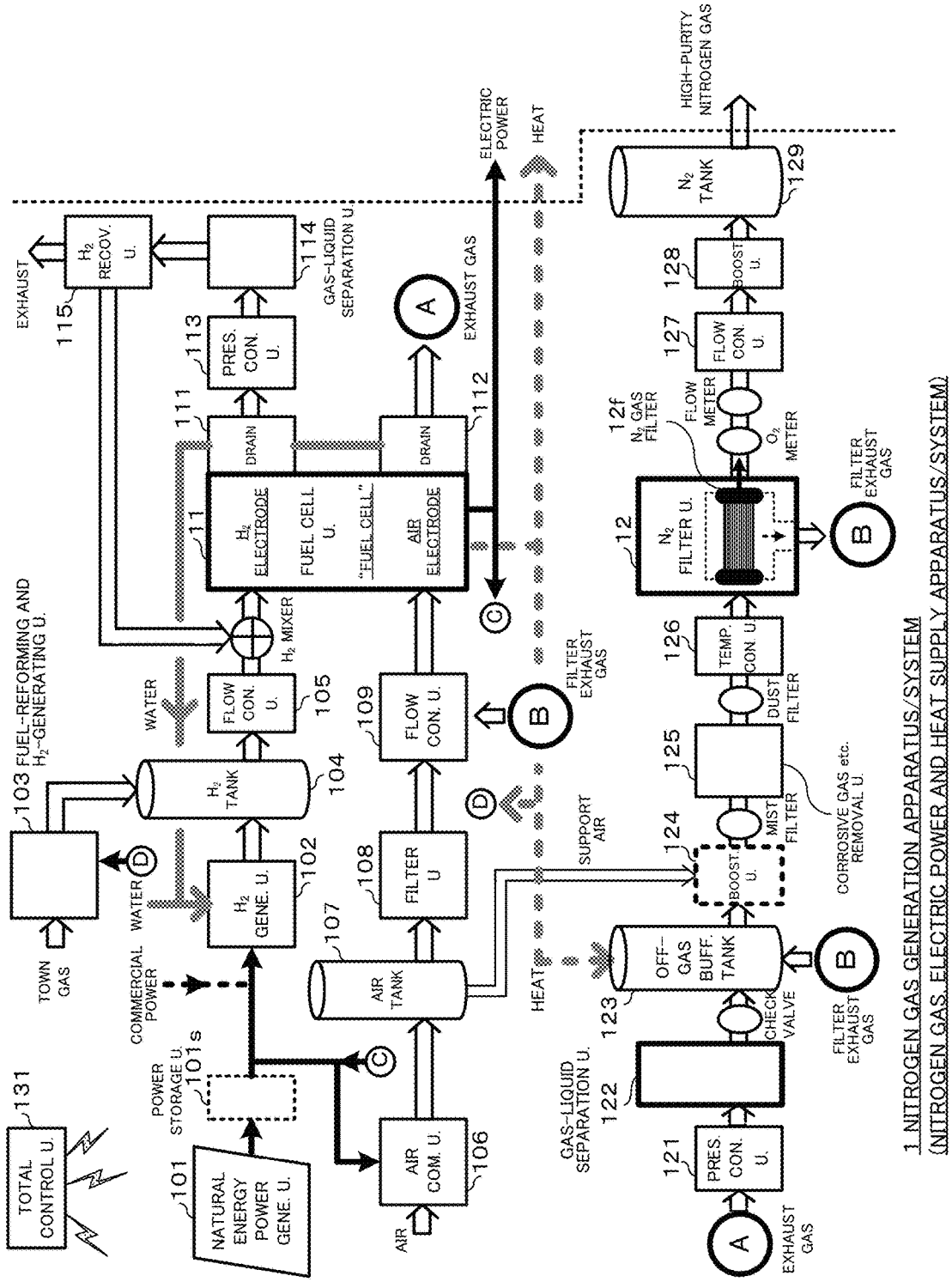
FIG. 1 is a schematic view showing one embodiment of a nitrogen gas generation apparatus/system according to the present invention.

Embodiments for implementing the present invention will be described below in detail with reference to the appended drawings. Here, in the drawings, the same components are denoted with the same reference numerals. In addition, components that can have the same structures and functions may be denoted with the same reference numerals. In addition, dimensional ratios within components and between components in the drawings are arbitrary for ease of understanding of the drawings.

[Nitrogen Gas Generation Apparatus/System]

FIG. 1 is a schematic view showing one embodiment of a nitrogen gas generation apparatus/system according to the present invention.

A nitrogen gas generation apparatus 1 (or a nitrogen gas generation system 1) according to one embodiment of the present invention shown in FIG. 1, includes (A) a "fuel cell (in a fuel cell U (unit) 11)" that operates by taking in "air or a gas containing nitrogen and oxygen" and a "fuel gas" (in the present embodiment, hydrogen),"

Figure 6A:
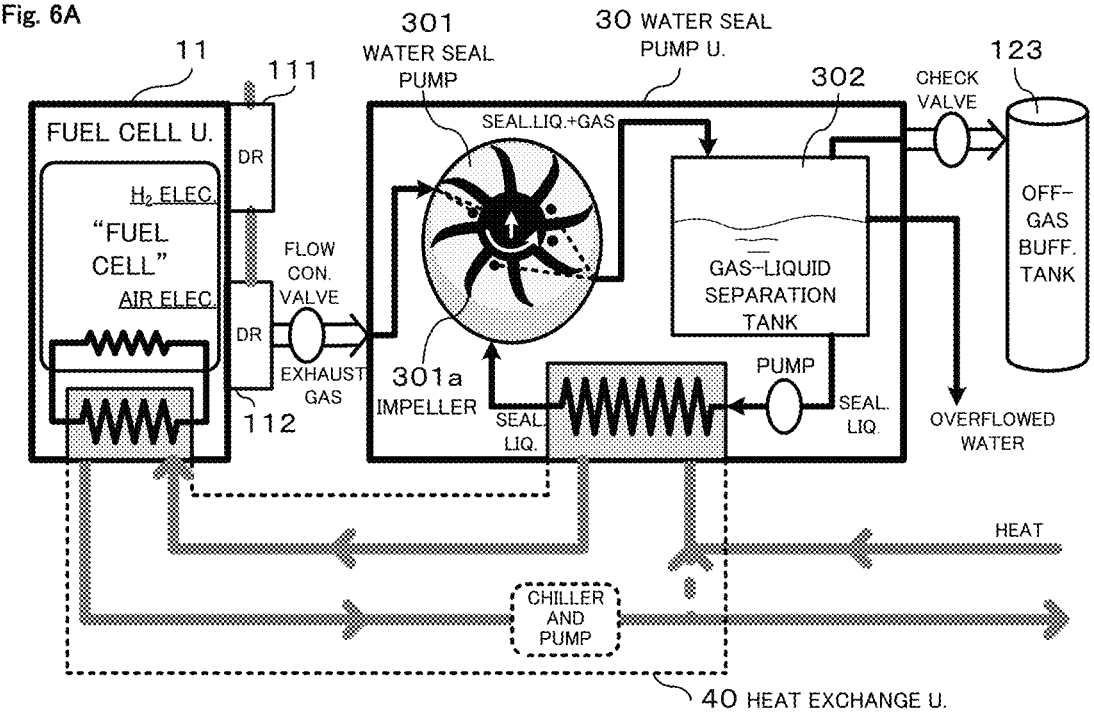
FIG. 6A and FIG. 6B are a schematic view illustrating another embodiment in the dehumidification mechanism according to the present invention.
Figure 6B:
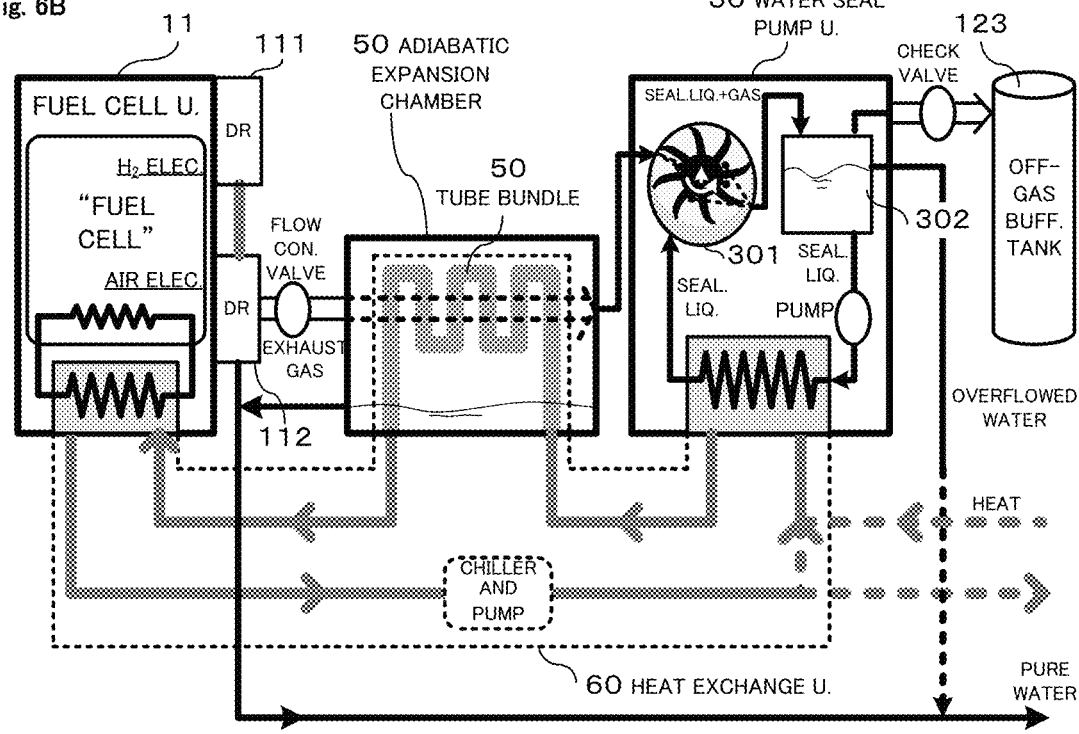

(B) a dehumidification mechanism (a gas-liquid separation U (unit) 122 in FIG. 1, and a water seal pump U (unit) 30 in FIGS. 6A and 6B) that reduces a moisture or water vapor content in the "exhaust gas (off gas)" having a lower oxygen concentration than air extracted from the "fuel cell", and (C) a filtering mechanism (a nitrogen filter U (unit) 12 in FIG. 1) which includes "a nitrogen gas filter 12ƒ" using fibers (for example, hollow fibers) with different degrees of permeation for nitrogen and oxygen and converts the "exhaust gas" with a reduced moisture or water vapor content into a gas having an increased nitrogen concentration.

Here, as described above, "the nitrogen gas filter 12ƒ" in the above (C) is a filter using fibers with different degrees of permeation for nitrogen and oxygen, and the inventors of the present invention will explain details thereof below, but it has been confirmed by experiments that, in the filter using the fibers, the "oxygen-concentration reduction index" in the "exhaust gas" having a lower oxygen concentration (the unit is percent by volume (vol %) that indicates ml in 100 ml of a medium) than air is larger when the oxygen concentration is lower.

In this manner, according to the nitrogen gas generation apparatus (system) 1, by combining a "fuel cell" and "the nitrogen gas filter 12ƒ," which are very compatible in consideration of the low oxygen concentration, it is possible to efficiently generate nitrogen gas having a low oxygen concentration, that is, of a high purity.

Incidentally, as will be described in detail, the inventors of the present invention confirmed by experiments that, when an "exhaust gas" having an oxygen concentration of 2.5 vol % or less is applied to "the nitrogen gas filter 12ƒ," an "exhaust gas" whose oxygen concentration is ⅒ or less of that of the result obtained when air is applied to the filter can be extracted from "the nitrogen gas filter 12ƒ."

Further, the inventors of the present invention confirmed by experiments that, in "the nitrogen gas filter 12ƒ" used in the present embodiment, the recovery ratio is higher when the oxygen concentration of the gas to be filtered is lower. Therefore, when such a "nitrogen gas filter 12ƒ" is used for filtering an "exhaust gas" having a lower oxygen concentration than air, it is possible to further increase the recovery ratio in the high-purity nitrogen gas. Here, this recovery ratio will be described below in detail.

Here, "the nitrogen gas filter 12ƒ" is a filter using fibers with different degrees of permeation for nitrogen and oxygen as described above. The inventors of the present invention confirmed by experiments that, in such a filter using the fibers, when the pressure of the "exhaust gas" to be applied is higher, the oxygen concentration of the "exhaust gas" extracted from the filter is lower, that is, a higher-purity nitrogen gas is obtained. Therefore, in the present embodiment, a booster U (unit) 124 is provided in front of the nitrogen filter U, which increases the pressure of the "exhaust gas" to be applied, thus it is possible to efficiently generate nitrogen gas having a low oxygen concentration, that is, of a high purity.

Incidentally, as will be described in detail, it has been confirmed by experiments that it is preferable to set the pressure of the "exhaust gas" applied to "the nitrogen gas filter 12ƒ" to a value exceeding a pressure threshold, which depends on "the nitrogen gas filter 12ƒ" and which becomes a larger value when the flow rate of the "exhaust gas" extracted from "the nitrogen gas filter 12f" is larger.

Here, the expression "high purity" or "the purity is high" mentioned above refers to a state in which the oxygen concentration in the nitrogen gas is sufficiently reduced. Specifically, the nitrogen concentration (the unit is percent by volume (vol %) that indicates ml in 100 ml of a medium) in the nitrogen gas with "high purity" or of which "the purity is high" generated in the present embodiment may be, for example, 95 vol % or more or 99 vol % or more, or may be set to 99.9 vol % or more or 99.99 vol % or more, depending on the fields and applications of use of the nitrogen gas.

In addition, the dehumidification mechanism in the above (B) reduces the moisture or water vapor content in the "exhaust gas" whose relative humidity is generally about 100% so that the subsequent high purification treatment is performed reliably and stably without being adversely affected by the moisture or water vapor content. Therefore, the dehumidification mechanism is an important means for efficiently generating a high-purity nitrogen gas. Here, as this important dehumidification mechanism, it is preferable to use the water seal pump U 30 including a water seal pump, which will be described below in detail with reference to FIGS. 6A and 6B.

[Configuration of Apparatus/System]

As also shown in FIG. 1, the nitrogen gas generation apparatus (system) 1 of the present embodiment is an apparatus (system) including (a) the fuel cell U (unit) 11 including a "fuel cell", (b) a natural energy power generation U (unit) 101, a power storage U (unit) 101s, a hydrogen generation U (unit) 102, a fuel-reforming and hydrogen-generating U (unit) 103, a hydrogen tank 104, a flow control U (unit) 105, an air compression U (unit) 106, an air tank 107, a filter U (unit) 108, and a flow control U (unit) 109 provided at positions in front of the fuel cell 11, (c) a drain 111, a pressure control U (unit) 113, a gas-liquid separation U 114, and a hydrogen recovery U (unit) 115 provided at later positions on the side of the hydrogen electrode of the fuel cell U 11, (d) a drain 112, a pressure control U 121, the gas-liquid separation U 122, an off-gas buffer tank 123, the booster U 124, a corrosive gas etc. removal U (unit) 125, a temperature control U (unit) 126, a flow control U 127, the nitrogen filter U 12 including the nitrogen gas filter 12f, a booster U 128, and a nitrogen tank 129 provided at later positions on the side of the air electrode of the fuel cell U 11, and (e) a total control U (unit) 131.

The apparatus (system) can take in air, water, natural energy such as sunlight, and in some cases, town gas, and even commercial power, to supply a high-purity nitrogen gas, electric power, and thermal energy to the outside.

That is, the nitrogen gas generation apparatus (system) 1 of the present embodiment can also provide, as well as the generated nitrogen gas, electric power and thermal energy generated by the operated "fuel cell" to the outside, and can also be regarded as a nitrogen gas, electric power and heat supply apparatus (system).

Here, the nitrogen gas generation apparatus (system) 1 may include at least a fuel cell U11, components directly connected thereto, the gas-liquid separation U 122, and the nitrogen filter U 12, and may constitute a nitrogen gas generation system together with at least the natural energy power generation U 101 outside the apparatus. For example, the nitrogen gas generation apparatus (system) 1 may be an apparatus (system) which includes all components other than the natural energy power generation U 101, the power storage U 101s, the hydrogen generation U 102, the fuel-reforming and hydrogen-generating U 103, the hydrogen tank 104, the air compression U 106, the air tank 107, the booster U 128 and the nitrogen tank 129.

Further, the nitrogen gas generation apparatus (system) 1 may include, for example, a piping joint as an exhaust gas inlet that can be connected to the exhaust gas outlet in the fuel cell installed outside, and can be an apparatus (system) that takes in an exhaust gas discharged from the external fuel cell and outputs the nitrogen gas having a reduced oxygen concentration. It may be a so-called "fuel-cell-attached-type filtering apparatus (system)" that can be attached to the fuel cell.

That is, in this case, the nitrogen gas generation apparatus (system) 1 is an apparatus (system) including (a) an exhaust gas inlet for receiving an exhaust gas discharged from an external fuel cell, (b) a dehumidification mechanism that reduces the moisture or water vapor content in the received exhaust gas, and (c) a filter which uses fibers with different degrees of permeation for nitrogen and oxygen and outputs a gas having an increased nitrogen concentration by applying thereto the exhaust gas having a reduced moisture or water vapor content.

Incidentally, in the apparatus/system configuration diagram of FIG. 1, material/energy transfer and the flow of processes to be performed, which are indicated by connecting components with arrows, can be understood as one embodiment of the nitrogen gas generation method according to the present invention.

Also in FIG. 1, the natural energy power generation U 101 may be a solar cell power generation unit which includes a solar cell and converts sunlight into electric power, a wind power generation unit which rotates a rotor with blades using wind power, drives a power generation device, and generates electric power, or a micro hydraulic power generation unit which rotates a turbine (water turbine) using a water flow (hydraulic power), drives a power generation device, and generates electric power.

Further, various other power generation units can be used as the natural energy power generation U 101 as long as light energy of sunlight or kinetic energy of a wind/water flow is finally converted into electric energy. In addition, the natural energy power generation U 101 may be a combination of two or more of the power generation units described above. In any case, preferably, the output unit of the generated electric power includes a wattmeter that checks whether power is generated at each time point and measures the amount of generated electric power.

The power storage U 101s includes, for example, a secondary battery such as a lithium (Li) battery and a lead (Pb) power storage battery, and is a power storage unit that stores and holds electric power supplied from the natural energy power generation U 101. In addition, preferably, the power storage U 101s includes a power storage meter that measures the amount of power storage at each time point and checks whether the unit is fully charged. Here, electric power is supplied from the power storage U 101s to the hydrogen generation U 102 (which electrolyzes water) to be described below and the air compression U 106, but instead of or together with this power, commercial power may be supplied to the hydrogen generation U 102 and the air compression U 106.

As an alternative, it is also preferable to supply electric power directly from the natural energy power generation U 101 to the hydrogen generation U 102 and the air compression U 106 without using the power storage U 101s that has a predetermined limit to the amount of power storage and includes an expensive secondary battery (or with just setting the power storage U 101s as an auxiliary). In this case, natural energy is utilized through being directly converted into chemical energy of hydrogen or physical energy of compressed air.

Here, when the natural energy power generation U 101 generates AC (alternating current) power (for example, when it includes an AC power generator), the AC power or commercial power is converted into a DC (direct current) by a converter and then supplied to the power storage U 101s and the hydrogen generation U 102. In addition, if the air compression U 106 includes a DC-driven compressor 22, the power is converted into a DC and then supplied to the air compression U 106.

In any case, the total control U 131 can appropriately switch and control supply of electric power to the hydrogen generation U 102 and the air compression U 106 as described above while monitoring, for example, the power generation status of the natural energy power generation U 101 and the power storage status of the power storage U 101s.

Also in FIG. 1, the hydrogen generation U 102 is a hydrogen supply unit including an electrolysis part that can electrolyze acquired water and generate hydrogen and oxygen using the supplied electric power. Here, various known electrolysis methods can be used, and, for example, a laminate including a plurality of electrolysis cells having a structure in which a solid polyelectrolyte membrane is interposed between a catalyst and an electrode may be used for electrolyzing.

Further, the hydrogen generation U 102 preferably includes a dehumidification part that removes moisture from the generated hydrogen and oxygen. In addition, a mechanism in which the removed moisture is returned to the electrolysis part again for electrolysis may be provided. In addition, a wattmeter that can measure electric power consumed at each time point and check whether electric power is being consumed or not is preferably provided, and a flow meter or a gas pressure gauge that can measure the amount of generated hydrogen and oxygen and check whether hydrogen and oxygen are generated or not may be provided.

The fuel-reforming and hydrogen-generating U 103 takes in a hydrocarbon gas such as town gas or LPG, mixes the hydrocarbon gas with water vapor, and generates a hydrogen-containing gas mainly composed of hydrogen ($H_2$) from the mixed gas according to a water vapor reforming reaction. In addition, there is preferably provided a mechanism in which a carbon monoxide gas content contained in the generated hydrogen-containing gas is reduced using a CO modification catalyst or the like, and additionally, the carbon monoxide concentration is further reduced using a CO selective oxidation catalyst.

Incidentally, when a solid oxide fuel cell (SOFC) is used as the "fuel cell" of the fuel cell U 11 to be described below, it is possible to apply exhaust heat from the "fuel cell" to a large amount of heat (high temperature) required for the water vapor reforming in the fuel-reforming and hydrogen-generating U 103.

Here, the nitrogen gas generation apparatus (system) 1 may include either the hydrogen generation U 102 or the fuel-reforming and hydrogen-generating U 103 as a hydrogen (fuel) supply source, or preferably includes both of them in order to secure various supply sources. In addition, instead of or together with these supply sources, the hydrogen gas itself may be supplied from another system/apparatus.

The hydrogen tank 104 is a gas tank that temporarily holds and stores hydrogen gas supplied from the hydrogen generation U 102 and the fuel-reforming and hydrogen-generating U 103 in a compressed (high pressure) state, and may include a hydrogen storage alloy cylinder. In addition, preferably, a gas pressure gauge is provided in the hydrogen tank 104, and the gas pressure in the tank can be measured at each time point.

The flow control U 105 is a unit that controls a pressure and a flow rate of hydrogen gas supplied from the hydrogen tank 104 to the fuel cell U 11. Specifically, it may include a hydrogen gas regulator and a hydrogen gas mass flow controller (or a flow switch).

Here, hydrogen gas that is in a high pressure (for example, 1.1 to 7 atm, about 0.11 to 0.7 MPa (megapascal)) state having a pressure exceeding atmospheric pressure (1 atm, about 0.1 MPa) may be supplied to the side of a hydrogen electrode of the fuel cell U 11. That is, in the present embodiment, the back pressure of the "fuel cell" provided in the fuel cell U 11 can be set to, for example, atmospheric pressure or a pressure exceeding atmospheric pressure. Here, the back pressure becomes 1 atm (about 0.1 MPa) when the outlet side of the "fuel cell" is in an open state, that is, when the pressure of the exhaust gas is atmospheric pressure.

However, when a mass flow controller is used in the flow control U 105, a pressure loss generally occurs here. Therefore preferably, hydrogen gas with a pressure higher than the set pressure (back pressure) by, for example, about 1 to 2 atm (about 0.1 to 0.2 MPa) is received from the hydrogen tank 104, the pressure is regulated by a regulator, and the hydrogen gas is then caused to flow to the mass flow controller. Incidentally, it has been found by experiments that the above-mentioned pressure loss increases when the flow rate decreases (the flow is reduced).

Also in FIG. 1, the air compression U 106 is a unit including a compressor that compresses, to a high pressure, air taken in from, for example, the atmosphere and supplies the air to the air tank 107. As a compression method type in the compressor, for example, various method types such as a reciprocating type, a scroll type, a screw type, a rotary type, or a swing type, or a combination of two or more thereof can be used.

The air tank 107 is a gas tank that temporarily holds and stores compressed air supplied from the air compression U 106 in the compressed state. Preferably, a gas pressure gauge is also provided in the air tank 107, and the gas pressure in the tank can be measured at each time point.

The filter U 108 is a unit which includes an air filter and an oil filter, and removes micro dust, oil components and the like from the high-pressure air supplied from the air tank 107 using these filters.

The flow control U 109 is a unit that controls the pressure and flow rate of the compressed air supplied from the air tank 107 via the filter U 108 to the side of the air electrode of the fuel cell U 11. Specifically, it may include a gas regulator and a mass flow controller (or a flow switch).

Here, in the present embodiment, the compressed air may also be supplied to the side of the air electrode in the fuel cell U 11 in the high-pressure state (for example, 1.1 to 7 atm, about 0.11 to 0.7 MPa) having a pressure exceeding atmospheric pressure (1 atm, about 0.1 MPa) (for example, setting a back pressure to a pressure exceeding atmospheric pressure). Further in this case, in consideration of pressure loss of the mass flow controller, preferably, compressed air with a pressure higher than the back pressure by, for example, about 1 to 2 atm (about 0.1 to 0.2 MPa), is received from the air tank 107, the pressure is regulated by a regulator, and the compressed air is then caused to flow to the mass flow controller, which is the same as in the hydrogen gas described above.

Also in FIG. 1, the fuel cell U 11 is a unit which includes a "fuel cell" and extracts and outputs an exhaust gas having a lower oxygen concentration than air, electric power, heat, and water (water vapor) from the "fuel cell".

Of course, the fuel cell U 11 can be used by setting the back pressure of the "fuel cell" to atmospheric pressure (1 atm, about 0.1 MPa). However, as one preferable embodiment, the fuel cell U 11 may include a "fuel cell"
- (a) in which set is a back pressure exceeding atmospheric pressure (for example, 1.1 to 7 atm, about 0.11 to 0.7 MPa),
- (b) which receives hydrogen gas having a pressure exceeding atmospheric pressure (for example, 1.1 to 7 atm, about 0.11 to 0.7 MPa) from the flow control U 105, and receives compressed air having a pressure exceeding atmospheric pressure (for example, 2 to 7 atm) from the flow control U 109, and is then in operation, and
- (c) which discharges an exhaust gas having a pressure exceeding atmospheric pressure (for example, 1.1 to 7 atm, about 0.11 to 0.7 MPa).

Here, the "fuel cell" may have a known configuration, and may have a structure in which, for example, a plurality of cells having a structure in which an electrolyte is interposed between a hydrogen electrode (a fuel electrode, a positive electrode, or an anode) and an air electrode (an oxygen electrode, a negative electrode, or a cathode) are stacked (laminated) with separators therebetween.

Further, as the cell type of the "fuel cell", a polymer electrolyte fuel cell (PEFC), a solid oxide fuel cell (SOFC), a phosphoric acid fuel cell (PAFC), a molten carbonate fuel cell (MCFC), and the like can be used. Among these, the SOFC has high power generation efficiency, operates generally at about 700 to about 1,000 degrees centigrade (° C.), and can supply an exhaust gas with a considerably high temperature. As described above, when hydrogen gas is generated from town gas or the like using the fuel-reforming and hydrogen-generating U 103, the SOFC can supply a large amount of heat required for the water vapor reforming. While, the PEFC is a fuel cell which is used, for example, in many fuel cell vehicles, because it operates at a relatively low temperature and the battery size can be reduced.

In the case that the PEFC is employed, for example, a JARI type fuel cell developed for research and development by the Japan Automobile Research Institute (JARI) can be used as the "fuel cell" in the fuel cell U 11. The JARI type fuel cell has a structure in which a pressure can be applied to the interior of the cell by increasing the back pressure, and moreover, all the exhaust gas having a high back pressure can be recovered.

In addition, as the "fuel cell", a fuel cell having, for example, a maximum output of more than 10 kW (for example, a fuel cell manufactured by Sweden's fuel cell manufacturer PowerCell) can be used. For example, in a PowerCell's fuel cell having 96 cells and a maximum output of 12.9 kW, the hydrogen gas flow rate and air flow rate required for outputting 10 kW electric power are 150 L/min (liters/minute) and 500 L/min, respectively, and in that case, the flow rate of nitrogen gas contained in the exhaust gas is 400 L/min. Further, the flow rate of water vapor contained in the exhaust gas is 150 L/min, which is 5.3 L/h (liters/hour) in terms of water.

Incidentally, in order to reduce such a large amount of water vapor content/moisture discharged from the "fuel cell" and perform the subsequent nitrogen gas generation process reliably and stably, a dehumidification mechanism (the gas-liquid separation U 122 in FIG. 1, and the water seal pump U 30 in FIGS. 6A and 6B) are required. Here, the water recovered by this dehumidification mechanism is preferably provided as pure water or high-purity water to the outside. In addition, for such a "fuel cell", both air and hydrogen gas are preferably introduced via a wetting device (not shown) in order to reduce decrease in proton conductivity (due to wet deficiency) of the electrolytic membrane, which causes heat loss in the fuel cell reaction.

In the present embodiment, the pressure in the "fuel cell", that is, the back pressure is adjusted and controlled by a back-pressure regulating valve of the pressure control U 113 and a back-pressure regulating valve of the pressure control U 121 to be described below. Here,
- (a) a back pressure on the side of the hydrogen electrode, which is mainly adjusted by the back-pressure regulating valve of the pressure control U 113, and
- (b) a back pressure on the side of the air electrode, which is mainly adjusted by the back-pressure regulating valve of the pressure control U 121,
are preferably controlled so that they are substantially the same. Actually, if there is a difference of about 0.1 atm (0.01 MPa) between the two back pressures, a slight amount of gas may leak from the "fuel cell", and on the other hand, it has been experimentally found that, if both back pressures are the same, no problem occurs even with a considerably high back pressure. In particular, when the "fuel cell" is a PEFC, since the electrolytic membrane is relatively thin, it is more preferable to make both back pressures the same.

In addition, the fuel cell U 11 including the "fuel cell" described above preferably includes a measurement system/sensor group that can measure
- (a) a flow rate, a pressure and/or a temperature of hydrogen gas and air taken in the "fuel cell",
- (b) a flow rate, a pressure and/or a temperature of an exhaust gas and water vapor/moisture discharged from the "fuel cell", and
- (c) a complex impedance between a hydrogen electrode and an air electrode of the "fuel cell".

Further, it is preferable to control operation of the "fuel cell" by the total control U 131 that has received information from the measurement system/sensor group.

As an example of simple control, it is preferable that constructed is a machine learning model (using, for example, a Deep Neural Network (DNN) algorithm) in which the above (b) and the above (c) are explanatory variables and the above (a) are objective variables. Using the constructed model, a flow rate, a pressure, and/or a temperature of hydrogen gas and air supplied to the "fuel cell" may be adjusted so that the "fuel cell" produces a desired output. In addition, when the complex impedance value in the above (c) deviates from a predetermined allowable range, it is preferable to perform control such as stopping supply of hydrogen gas and stopping the "fuel cell".

Further, in the fuel cell U 11, a heat exchanger that circulates a heat exchange medium such as water may be disposed in or around the "fuel cell". The heat exchanger preferably extracts heat from the "fuel cell" that operates and generates heat, and transfers the heat to the outside of the unit. Examples of heat exchangers that can be used include a multi-tube type heat exchanger such as a shell and tube type heat exchanger and a plate type heat exchanger such as a brazed plate type heat exchanger (commercially available from Alfa Laval AB).

In addition, instead of the heat exchanger, it is possible to directly extract heat in the "fuel cell" to the outside using a heat transfer system that links a conductive separator in the "fuel cell" and a heat pipe. In any case, by such a heat exchange/conduction mechanism, the cell temperature of the "fuel cell" can be controlled such that it is a predetermined temperature (for example, 80° C.) or lower and a suitable operation of the "fuel cell" can be maintained. Here, when water (cooling water) is used as the heat exchange medium, it is preferable to remove ions (cations and anions) from circulating cooling water by an ion exchanger.

The heat transferred by the heat exchange medium or heat pipe in this manner can be used by being supplied not only to the outside but also to the inside of the system. In the present embodiment, the heat can be supplied to the off-gas buffer tank 123 to be described below, and can increase the temperature of the exhaust gas supplied to the nitrogen filter U 12 to a high temperature (for example, 45° C.). Of course, when the temperature of the exhaust gas is sufficiently high, such a heat treatment in the off-gas buffer tank 123 is unnecessary.

Further, the heat can be transferred to the fuel-reforming and hydrogen-generating U 103 through such a heat exchange medium or heat pipe, and the amount of heat required for water vapor reforming can be replenished. In addition, using the heat in the hydrogen generation U 102, water to be electrolyzed can be converted into water vapor, or the temperature of the water can be raised, thus the hydrogen generation efficiency in electrolysis can be improved.

Here in this case, in order to achieve the desired hydrogen generation efficiency and maintain it stably, it is preferable to monitor the temperature of the electrolysis cell with an installed temperature sensor, and control an electrolysis operation by the total control U 131. In addition, it is possible to increase a voltage applied between electrodes, and perform an electrolysis treatment that does not use an electrolyte and does not require electrolyte monitoring or maintenance.

In addition, for example, the inside of a facility in which this apparatus (system) 1 is installed can be heated using a high-temperature medium from a heat exchanger or a high-temperature medium that has received heat transferred through a heat pipe. Such a high-temperature medium may be put into a cooling column (cooling tower) to lower the temperature, the low-temperature medium may be used to generate cold air in a condenser/evaporator and an air conditioner, thus the inside of the facility can be cooled, for example. In addition, in this case, the nitrogen gas generation apparatus (system) 1 can also assist an operation of these air conditioning devices using electric power from the "fuel cell", and therefore, it can also function as an energy saving apparatus (system) in the facility.

As another embodiment in the fuel cell U 11, two or more "fuel cells" are connected in series, an exhaust gas from the previous fuel cell is sequentially taken in and used for a cell reaction, and finally, an exhaust gas having a lower oxygen concentration, for example, an oxygen concentration of 2.5 vol % or less, can be easily extracted. Here, the above-described fuel cell configuration, invented by the inventors of the present invention, is disclosed in Japanese Patent Application Publication No. 2019-129110.

Also in FIG. 1, the drains 111 and 112 are provided at the fuel path outlet (on the side of the hydrogen electrode) and the air path outlet (on the side of the air electrode) of the "fuel cell" in the fuel cell U 11, respectively. These drains recover water generated by condensation of water vapor contained in the exhaust gas (generally, the relative humidity is about 100%). Therefore, the adverse effect on the cell reaction due to a so-called flooding phenomenon can be reduced. In addition, the water recovered in this manner may be sent to the hydrogen generation U 102 and reused as a hydrogen generation material.

Here, by setting the back pressure of the "fuel cell" to a value exceeding atmospheric pressure (for example, 2 to 7 atm, about 0.2 to 0.7 MPa), it is possible to increase the dew point, increase the amount of water falling into the drains 111 and 112, and improve the dehumidification effect. The drains 111 and 112 preferably have an auto-drain function of automatically discharging water to the outside when a predetermined amount of water accumulates.

The pressure control U 113 is a unit that returns hydrogen gas dehumidified by the drain 111 to a fuel path inlet (on the side of the hydrogen electrode) of the "fuel cell" (for example, at the rear stage of the flow control U 105), for example, via a hydrogen mixer, while maintaining the back pressure of the "fuel cell". Specifically, the pressure control U 113 includes a back-pressure regulating valve and a pressure gauge, and controls the pressure in the "fuel cell", particularly, the pressure (back pressure) on the side of the hydrogen electrode, by adjusting the back-pressure regulating valve.

The gas-liquid separation U 114 is a unit that removes the residual water vapor content and moisture from the exhaust gas discharged from the fuel path outlet (on the side of the hydrogen electrode) via the drain 111 and the pressure control U 113. Specifically, the water vapor content and moisture can be removed using a dehumidification apparatus including a dehumidifier, a dehumidification device with a pressurization mechanism, a gas-liquid separator, and/or a dry filter. Here, as the dehumidifier, a dehumidifier containing silica gel and/or zeolite can be used. And as a gas-liquid separator, a separator of a gravity separation type, a centrifuge separation type, a mist remover pad type, an airfoil type separation type, a barometric pressure separation coalescer type or the like can be used.

The hydrogen recovery U 115 is a unit that extracts unreacted residual hydrogen gas from the exhaust gas discharged from the fuel path outlet (on the side of the hydrogen electrode) using a known hydrogen gas filter or executor, and reuses it. The extracted hydrogen gas can be sent back the hydrogen mixer at the rear stage of the flow control U 105, for example. In addition, the gas from which hydrogen gas has been extracted may be discharged to the outside.

The pressure control U 121 is a unit that sends the exhaust gas dehumidified by the drain 112 (on the side of the air electrode) to the gas-liquid separation U 122 while maintaining the back pressure of the "fuel cell". Specifically, as in the pressure control U 113, the pressure control U 121 includes a back-pressure regulating valve and a pressure gauge, and controls the pressure in the "fuel cell" particularly, the pressure (back pressure) on the side of the air electrode, by adjusting the back-pressure regulating valve.

Also in FIG. 1, the gas-liquid separation U 122 is a unit that removes the residual water vapor content and moisture from the exhaust gas discharged from the air path outlet (on the side of the air electrode) via the drain 112 and the pressure control U 121. Specifically, the gas-liquid separation U 122 removes the water vapor content and moisture using a dehumidification apparatus including a dehumidifier, dehumidification device with a pressurization mechanism, or a gas-liquid separator. As one criterion, the gas-liquid separation U 122 may reduce the relative humidity in the exhaust gas to 60% or less, and more preferably 30% or less.

Figure 7:
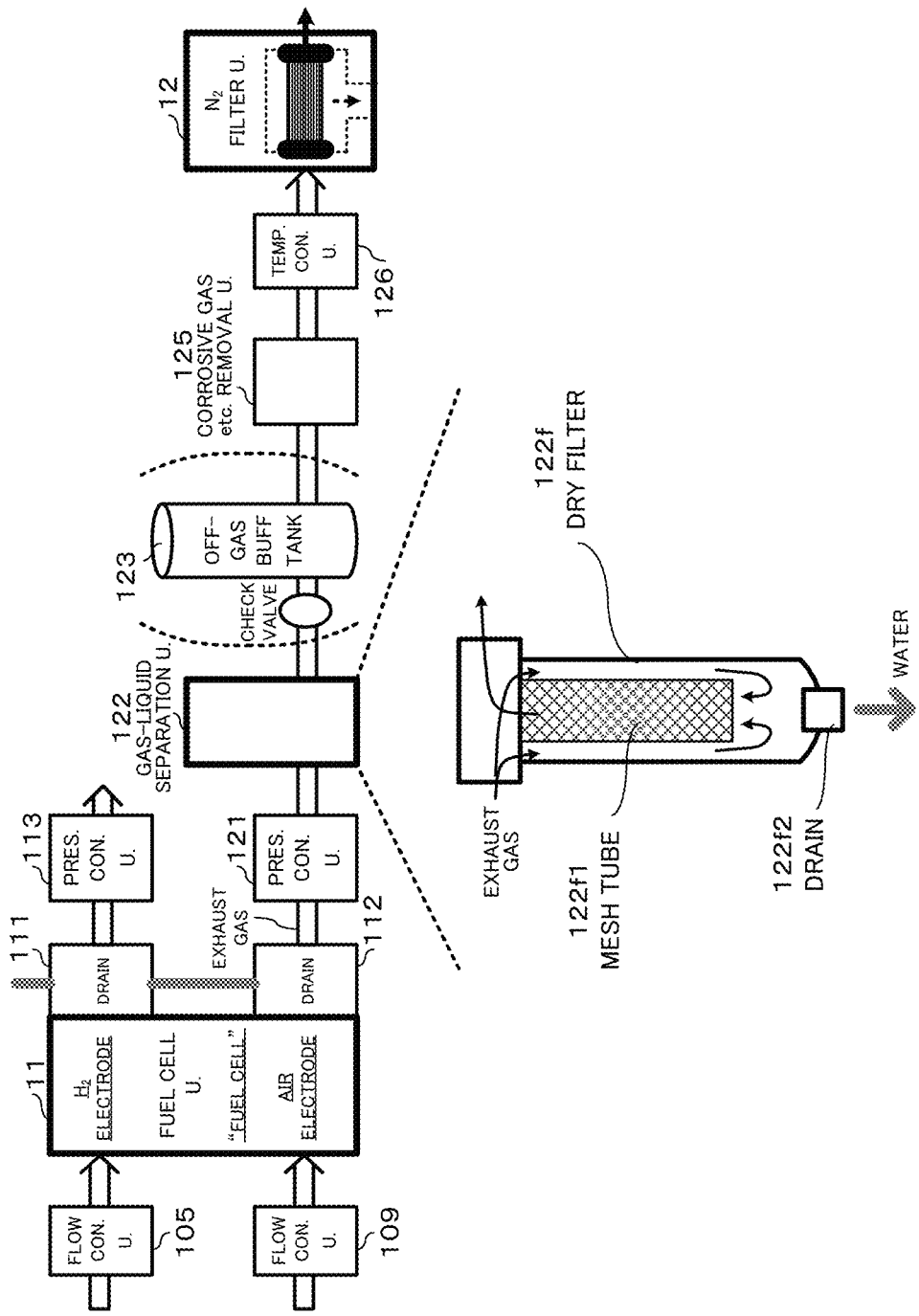
FIG. 7 is a schematic view illustrating one embodiment in the gas-liquid separation U as the dehumidification mechanism according to the present invention.

Further, as will be described below in detail with reference to FIG. 7, the gas-liquid separation U 122 may be a dry filter unit using a dry filter 122$f$ (FIG. 7). As another preferable embodiment, as will be described below in detail with reference to FIGS. 6A and 6B, the water seal pump U 30 including a water seal pump 301 can be used as a dehumidification mechanism instead of the gas-liquid separation U 122. In addition, the gas-liquid separation U 122 may be a pump unit including a dry vacuum pump. The dry vacuum pump is a vacuum pump that does not use oil or liquid in the vacuum chamber, and can be used for exhausting, for example, water vapor. As such a dry vacuum pump, an air-cooled dry vacuum pump NeoDry 60E (commercially available from KASHIYAMA Industries, Ltd.) may be used, for example. This air-cooled dry vacuum pump has a structure in which a pair of multi-stage roots rotors rotate in a non-contact manner to compress and exhaust a gas.

The off-gas buffer tank 123 is a gas tank that temporarily holds and stores the exhaust gas introduced from the gas-liquid separation U 122. The exhaust gas is introduced into the off-gas buffer tank 123 until the pressure becomes the same as the back pressure (for example, 1.1 to 7 atm, about 0.11 to 0.7 MPa). Here, in order to allow the exhaust gas to flow into the nitrogen filter U 12 to be described below at a desired pressure (for example, 7 atm, about 0.7 MPa), the flow rate of the exhaust gas to the off-gas buffer tank 123 is preferably set to a flow rate equal to or exceeding the required introduction flow rate with respect to the nitrogen filter U 12.

Incidentally, when the "fuel cell" is stopped, the pressure in the pipe connected to the off-gas buffer tank 123 returns to, for example, atmospheric pressure. Therefore, the off-gas buffer tank 123 preferably includes a check valve for preventing a backflow of the exhaust gas to the "fuel cell". In addition, preferably, a gas pressure gauge is provided in the off-gas buffer tank 123 and the gas pressure in the tank can be measured at each time point.

Further, in the off-gas buffer tank 123, the exhaust gas in the tank is preferably set to an exhaust gas with a temperature higher than room temperature (for example, 30 to 45° C.) using a "heating mechanism" that can perform a heat treatment with heat generated from the "fuel cell" in the fuel cell U 11. Thereby, it is possible to supply an exhaust gas with a temperature suitable for a nitrogen filtering treatment to the nitrogen gas filter 12$f$ of the nitrogen filter U 12 to be described below.

Here, as the above "heating mechanism" the heat exchanger or a separator and heat-pipe connecting system described above may be used. Thereby, it is possible to perform a suitable nitrogen filtering treatment by effectively utilizing heat of the "fuel cell" without using an energy consuming means such as an electric heater. Of course, when the temperature of the exhaust gas introduced into the off-gas buffer tank 123 is sufficiently high, such a heating mechanism is unnecessary.

The booster U 124 increases the pressure of the exhaust gas further (for example, to a pressure of 7 atm (about 0.7 MPa)) which is extracted from the "fuel cell" of the fuel cell U 11 and from which the moisture or water vapor content is reduced, and supplies the gas to the nitrogen filter U 12. As the booster U 124, a known compression pump, for example, Bebicon (registered trademark) POD-7.5VNB (commercially available from Hitachi Industrial Equipment Systems Co., Ltd.) can be used. Or, a known booster valve, for example, a booster valve VB11A or VBA42 for inert gas (commercially available from SMC) can be used. In addition, a pressure gauge for monitoring the increased pressure of the exhaust gas is preferably provided.

Here, most of known booster valves are of an air drive type. In this case, the booster valve may be driven using, as a support gas, a part of compressed air supplied to the "fuel cell", that is, compressed air extracted from the air tank 107. Thereby, there is no burden such as additional electric power consumption on driving of the booster valve. In addition, a booster type compressor is also preferably used as the booster U 124.

Incidentally, as described above, when the pressure of the exhaust gas from the off-gas buffer tank 123 is sufficiently high (for example, 7 atm (about 0.7 MPa)), of course, the booster U 124 is unnecessary. Further, although careful handing is required, hydrogen gas extracted from the hydrogen tank 104 can be used as the support gas.

Also in FIG. 1, the corrosive gas etc. removal U 125 is a unit that can perform a treatment of removing or reducing at least one of sulfide, chloride, hydrocarbon, fluoride and strong alkaline compounds on the exhaust gas (extracted from the "fuel cell") to be applied to the nitrogen gas filter 12$f$ of the nitrogen filter U 12.

For example, when hydrogen gas is generated from town gas or the like using the fuel-reforming and hydrogen-generating U 103 and is used as a fuel for the "fuel cell", various gas components other than hydrogen gas such as hydrogen sulfide, sulfurous acid gas, hydrocarbon gas such as methane gas, ammonia, formaldehyde, and the like are mixed into the exhaust gas. Further, in the case that the SOFC is used as the "fuel cell", nitrogen gas in air may be combined with oxygen in a high temperature atmosphere of around 800° C. and thus nitrogen oxide (NOx) may be generated. These gases not only become impurities in the final product nitrogen gas but also pose a risk of having an adverse effect on fibers (hollow fibers) of the nitrogen gas filter 12$f$.

Therefore, the corrosive gas etc. removal U 125 includes, for example, an activated carbon filter, and plays a role of removing the impurity gas in the exhaust gas or reducing it as much as possible. As one criterion, the corrosive gas etc. removal U 125 preferably reduces the concentration of hydrocarbon gas to 0.013 mg/Nm$^3$ (0.01 ppm wt) or less, and preferably reduces the concentration of a strongly acidic gas such as hydrogen sulfide, sulfurous acid gas, hydrogen chloride and fluorine, and a strongly alkaline gas such as amine, ammonia and caustic soda to a detection limit or less in a predetermined detection method.

Further, as shown in FIG. 1, it is preferable to install a mist filter and a dust filter in the front or rear stage of the corrosive gas etc. removal U 125. Among these, the mist filter is a filter that removes or reduces mist such as water mist, solvent mist and oil mist in the exhaust gas. As one criterion, the mist filter preferably reduces the concentration of residual oil from these mists to 0.01 mg/Nm$^3$ (0.008 ppm wt) or less. On the other hand, the dust filter is a filter that removes or reduces dust in the exhaust gas. As one criterion, the dust filter preferably eliminates almost all particles having a particle size of 0.01 μm or more.

The temperature control U 126 is a unit which includes, for example, an electric heater and makes the temperature of the taken exhaust gas close or equal to a suitable temperature preset based on the characteristics of the nitrogen gas filter 12$f$ and supplies the exhaust gas whose temperature is adjusted to the nitrogen filter U 12. As one preferable embodiment, the temperature control U 126 may receive heat supplied from the fuel cell U 11 via a heat exchanger and use the heat for temperature adjustment, and may also regulate the temperature of the exhaust gas with electric power supplied from the fuel cell U 11.

Incidentally, in a UBE $N_2$ separator NM-B01A (commercially available from Ube Industries, Ltd.) that can be used as the nitrogen gas filter 12*f* to be described below in detail, it is presented that, when the temperature of the introduction gas is 30 to 45° C. which is higher than room temperature (25° C.), the filtering effect becomes strong. In this case, when the temperature of the exhaust gas from the "fuel cell" is higher than room temperature (25° C.), a strong filtering effect can be exhibited without using the temperature control U 126, and accordingly, the amount of electric power consumed for temperature adjustment can be reduced.

Further, it is confirmed that, in the nitrogen gas filter 12*f* using fibers with different degrees of permeation for nitrogen and oxygen, the recovery ratio is greatly reduced when the temperature of the introduced exhaust gas is higher. Therefore, depending on the content of performance of the nitrogen gas output set in the present system, in order to secure the predetermined recovery ratio, the temperature of the exhaust gas can remain about the same as the temperature in the off-gas buffer tank 123 without using the temperature control U 126.

Also in FIG. 1, the nitrogen filter U 12 is a unit that applies the exhaust gas controlled by the flow control U 127 to the nitrogen gas filter 12*f* using fibers with different degrees of permeation for nitrogen and oxygen, and extracts the exhaust gas having an increased nitrogen concentration from the nitrogen gas filter 12*f*, that is, a high-purity nitrogen gas in the present embodiment.

Specifically, in the present embodiment, the nitrogen filter U 12 includes (a) the nitrogen gas filter 12*f*, (b) a filter input and output part that introduces an exhaust gas to be applied to the nitrogen gas filter 12*f* and extracts the exhaust gas having an increased nitrogen concentration from the nitrogen gas filter 12*f*, and (c) a filter purging part that extracts a gas (hereinafter abbreviated as a filter exhaust gas) separately from the exhaust gas extracted in the above (b), the gas (filter exhaust gas) being containing oxygen molecules separated from nitrogen molecules (in the exhaust gas) by the nitrogen gas filter 12*f*.

Specifically, as the nitrogen gas filter 12*f*, a hollow fiber filter using a polymer fiber material that allows oxygen molecules to permeate more preferentially than nitrogen molecules, can be employed. For example, the UBE $N_2$ separator NM-B01A (commercially available from Ube Industries, Ltd.) using polyimide hollow fibers may be used. The $N_2$ separator has a mechanism in which, while a high-pressure exhaust gas flows through hollow fibers, oxygen molecules selectively permeate the hollow fiber membrane, and finally, highly purified nitrogen gas is extracted from the outlet of the hollow fibers.

Of course, the nitrogen gas filter 12*f* is not limited to the above-described separator. For example, a UBE N2 separator NM series separator (commercially available from Ube Industries, Ltd.), a SEPURAN N2 membrane module (commercially available from Daicel-Evonik Ltd.) and also a selective type nitrogen gas filter (commercially available from Daicel-Evonik Ltd.) can be used as the nitrogen gas filter 12*f*.

Here, in such a nitrogen gas filter 12*f*, the relationship between (a) the oxygen concentration of the introduced exhaust gas (introduction oxygen concentration), the pressure of the introduced exhaust gas (introduction pressure), and the flow rate of the exhaust gas at the outlet of the filter 12*f* (outlet flow rate), and (b) the oxygen concentration of the exhaust gas at the outlet of the filter 12*f* (outlet oxygen concentration) and the recovery ratio of the filter 12*f* will be described below in detail using practical examples shown in FIGS. 2A to 2C, FIGS. 3A to 3C, FIG. 4, and FIGS. 5A to 5C, and there, various conditions for obtaining a high-purity nitrogen gas will also be described.

Here, the outlet flow rate in the above (a) can be measured with a flow meter installed on the outlet side of the nitrogen filter U 12 and controlled by the flow control U 127 to be described below. Further, the outlet oxygen concentration in the above (b) can also be measured with an oxygen concentration meter installed on the outlet side of the nitrogen filter U 12. Of course, the flow control U 127 is preferably installed immediately behind the oxygen concentration meter and the flow meter.

In addition, in the present embodiment, based on the value of the outlet oxygen concentration measured by the oxygen concentration meter, the total control U 131 controls the back-pressure regulating valve of the pressure control U 121 to adjust the back pressure of the "fuel cell", for example, controls the mass flow controller of the flow control U 127 to adjust the exhaust gas flow rate with respect to the filter, for example, and thus can achieve supply of a high-purity nitrogen gas having a desired extremely-low oxygen concentration.

Also in FIG. 1, the flow control U 127 is a unit that controls the flow rate of the exhaust gas having an increased nitrogen concentration generated by the nitrogen filter U 12, that is, a high-purity nitrogen gas in the present embodiment, and sends the nitrogen gas to the nitrogen tank 129 via the booster U 128. That is, as described above, it is a unit that controls the outlet flow rate (f_out) in the nitrogen gas filter 12*f*. Specifically, it may include a gas regulator and a mass flow controller (or a flow switch).

In the present embodiment, the booster U 128 is a unit that further increases the pressure of the high-purity nitrogen gas whose flow rate is controlled by the flow control U 127 (for example, to a pressure of 8 to 15 atm (about 0.8 to 1.5 MPa)), sends the gas to the nitrogen tank 129, and causes the nitrogen tank 129 to hold and store a larger amount of high-purity nitrogen gas. As the booster U 128, for example, a booster valve or a boost compressor can be used. Booster Bebicon (registered trademark) OBB-7.5GP (commercially available from Hitachi Industrial Equipment Systems Co., Ltd.) that can increase the pressure to 10 atm (about 1.0 MPa) or more may be used. In addition, a pressure gauge for monitoring pressure increase is preferably provided.

The nitrogen tank 129 temporarily holds and stores the high-purity nitrogen gas supplied from the nitrogen filter U 12 via the booster U 128, and serves as a nitrogen gas supply interface through which the high-purity nitrogen gas is stably supplied to the outside under control of, for example, the total control U 131. Preferably, a gas pressure gauge is also provided in the nitrogen tank 129 and the gas pressure in the tank can be measured at each time point.

Here, without using the nitrogen tank 129 (and the booster U 128), which is a nitrogen gas supply interface, the generated nitrogen gas may be directly supplied to the outside from the nitrogen filter U 12 via a predetermined flow control device. For example, in the case that the supply destination is a soldering apparatus or the like, the directly supplied high-purity nitrogen gas, which has a temperature exceeding at least room temperature (25° C.), is more suitable for using as a soldering atmosphere because the amount of heat required for a higher temperature of the atmosphere can be saved.

The total control U 131 is a controller which can communicate with main components including the fuel cell U 11 and the nitrogen filter U 12 described above, and preferably all components (including, for example, the water seal pump U 30 (FIGS. 6A and 6B)) via a wired or wireless communication network, receives the measured quantity outputted from a measurement unit/sensor of each component, for example, a pressure, a gas flow rate, a temperature, a nitrogen concentration, an oxygen concentration, a hydrogen concentration, and whether or not there is hydrogen leakage, appropriately performs monitoring, and supervises and controls each component.

For example, preferably, the total control U 131 includes a processor and a memory, a nitrogen gas generation system monitoring/control program for monitoring/controlling each component is installed and held in the memory, and the program is executed by the processor.

Here, the control performed by the total control U 131 includes adjustment and control of a pressure, a gas flow rate, a temperature, a nitrogen concentration, an oxygen concentration, and a hydrogen concentration in each component and between components. In particular, it is preferable to perform back pressure control on the "fuel cell" of the fuel cell U 11 and balance control between the back pressure on the side of the hydrogen electrode and the back pressure on the side of the air electrode.

In addition, it is preferable that the total control U 131 monitors the temperature (cell temperature) of the "fuel cell" of the fuel cell U 11, the temperature of the exhaust gas introduced into the nitrogen gas filter 12f of the nitrogen filter U 12, and also the temperature of the hydrogen generation U 102, and appropriately controls a fuel cell reaction, a filtering operation, and also a hydrogen generation (electrolysis) reaction in the nitrogen gas generation apparatus (system) 1. Further, the occurrence of hydrogen leakage in each component and between components is monitored, and when it is judged that a problem has occurred, the total control U 131 preferably send an alarm including information on the location of hydrogen leakage to the outside.

Example 1

FIGS. 2A, 2B and 2C, FIGS. 3A, 3B and 3C, and FIG. 4 are graphs illustrating Example (practical example) 1 according to a nitrogen gas generation process of the present invention.

In Example 1 in which the measurement results and analysis results are shown in FIGS. 2A to 2C, FIGS. 3A to 3C and FIG. 4, the UBE $N_2$ separator NM-B01A (commercially available from Ube Industries, Ltd.) was used as the nitrogen gas filter 12f (FIG. 1). Air having an oxygen concentration of 20.8 vol % and three mixed gases which were a gas in which nitrogen gas and oxygen gas were mixed and had an oxygen concentration of 10.3 vol %, 5.1 vol %, and 1.1 vol % were individually introduced to the nitrogen gas filter 12f at room temperature (25° C.), and (a) the oxygen concentration of the introduced gas (introduction oxygen concentration c_in_O2 (vol %)), the pressure of the introduced gas (introduction pressure p_in (atm)), and the flow rate of the exhaust gas at the outlet of the nitrogen gas filter 12f (outlet flow rate f_out (L/min)), and (b) the oxygen concentration of the gas at the outlet of the nitrogen gas filter 12f (outlet oxygen concentration c_out_O2 (ppm vol))

were measured, and the relationship between the above (a) and (b) was examined.

Here, the oxygen concentrations of 10.3 vol %, 5.1 vol %, and 1.1 vol % in the introduction gas are values each of which can appear in the exhaust gas of the actual "fuel cell".

Figure 2A:
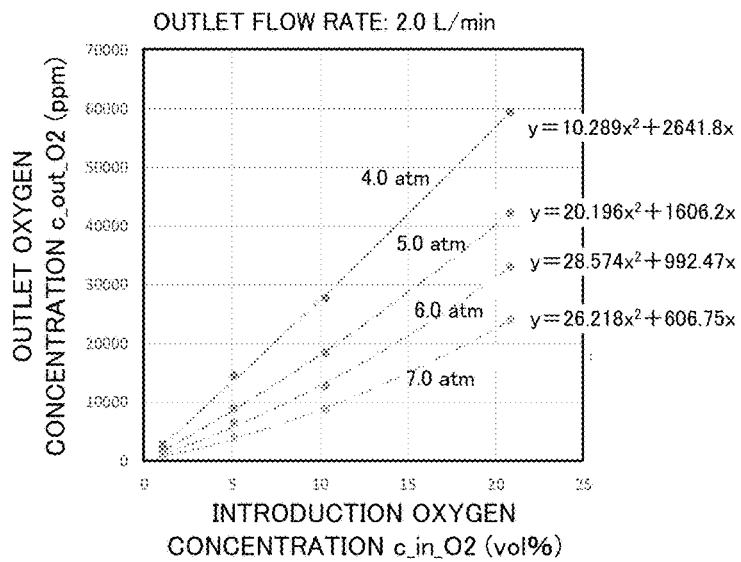
FIG. 2A, FIG. 2B and FIG. 2C are graphs illustrating Example 1 according to a nitrogen gas generation process of the present invention.
Figure 2B:
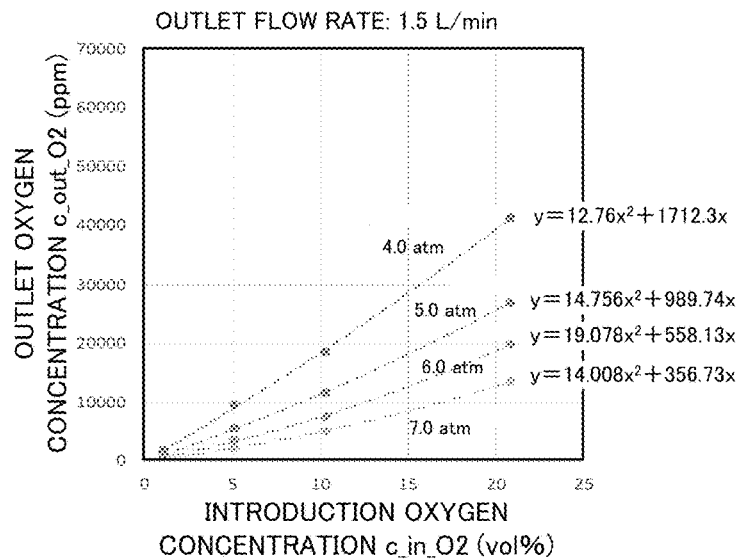
Figure 2C:
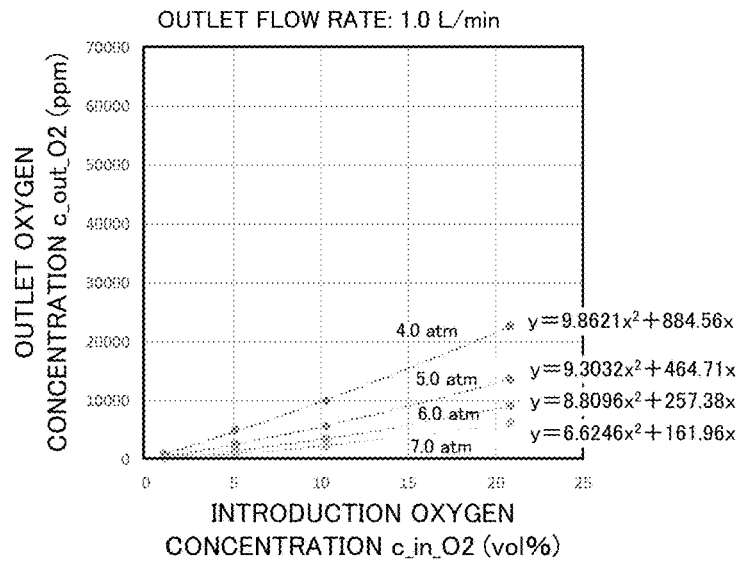

FIGS. 2A, 2B and 2C are graphs showing the relationship between the introduction oxygen concentration c_in_O2 and the outlet oxygen concentration c_out_O2 under conditions of an outlet flow rate f_out of 2.0 L/min, 1.5 L/min, and 1.0 L/min, respectively.

According to these graphs, it is understood that the outlet oxygen concentration c_out_O2 is lower and a higher-purity nitrogen gas is output from the nitrogen gas filter 12f, (a) when the introduction oxygen concentration c_in_O2 is lower, (b) when the introduction pressure p_in is larger, and (c) when the outlet flow rate f_out is lower.

For example, when the introduction oxygen concentration c_in_O2 is set to 1.1%, the introduction pressure p_in is set to 7.0 atm (about 0.7 MPa), and the outlet flow rate f_out is set to 1.0 L/min, the outlet oxygen concentration c_out_O2 is 325 ppm (0.0325 vol %) (although it is a graph point shown in FIG. 2C). Here, it is known that, under the same introduction oxygen concentration and introduction pressure conditions as described above, when the outlet flow rate f_out is set to be smaller at 0.75 L/min, the outlet oxygen concentration c_out_O2 is a very small value of 190 ppm (0.0190 vol %), and a high-purity nitrogen gas having an extremely-low oxygen concentration is obtained. And, it is confirmed by experiments that such a tendency of results is almost unchanged even when the temperature of the gas introduced into the nitrogen gas filter 12f is 40° C. and 50° C.

<Outlet Flow Rate and Outlet Oxygen Concentration>

First, a more specific relationship between the outlet flow rate f_out and the outlet oxygen concentration c_out_O2 will be described. Based on data of the graphs shown in FIGS. 2A to 2C, it is derived that the relationship between the two is represented by the following formula.

$$(c\_out\_O2) = C \cdot (f\_out)^a \tag{1}$$

Here, it is found that, (a) the term coefficient C has a positive value, and has a smaller value when the introduction oxygen concentration c_in_O2 is lower and the introduction pressure p_in is larger. For example, when the introduction oxygen concentration c_in_O2 is 1.1% and the introduction pressure p_in is 7.0 atm (about 0.7 MPa), the C value is 319 (ppm), which is a very small value, and (b) on the other hand, power coefficient 'a', which hardly depends on the introduction oxygen concentration c_in_O2, is around 1.6 when the introduction pressure p_in is 4.0 atm (about 0.4 MPa). And the power coefficient, which becomes a larger value when the introduction pressure p_in is larger, is around 2.0 when the introduction pressure p_in is 7.0 atm (about 0.7 MPa).

Therefore, in any case, it is understood that, when the outlet flow rate f_out is lower, the outlet oxygen concentration c_out_O2 can be lower, that is, a high-purity nitrogen gas having a lower oxygen concentration is obtained. Here, since the power coefficient 'a' is determined only by the introduction pressure p_in, the mechanism of contribution of the outlet flow rate to the outlet oxygen concentration is considered to be dynamic with respect to the fiber state of the filter 12f which is determined by the introduction pressure thereof.

<Introduction Oxygen Concentration and Filtering Effect>

Next, using the analysis results shown in FIGS. 3A to 3C, the relationship between the introduction oxygen concentration c_in_O2 and the filtering effect of the nitrogen gas filter 12f, that is, the degree of the oxygen concentration reduction effect, will be described.

Figure 3A:
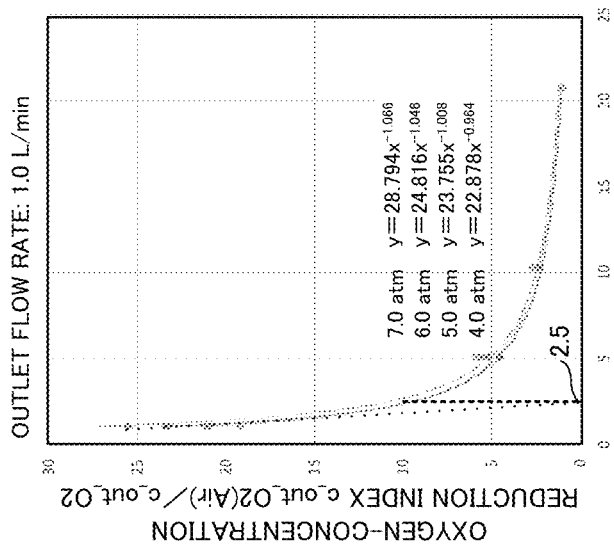
FIG. 3A, FIG. 3B and FIG. 3C are graphs illustrating Example 1 according to a nitrogen gas generation process of the present invention.
Figure 3B:
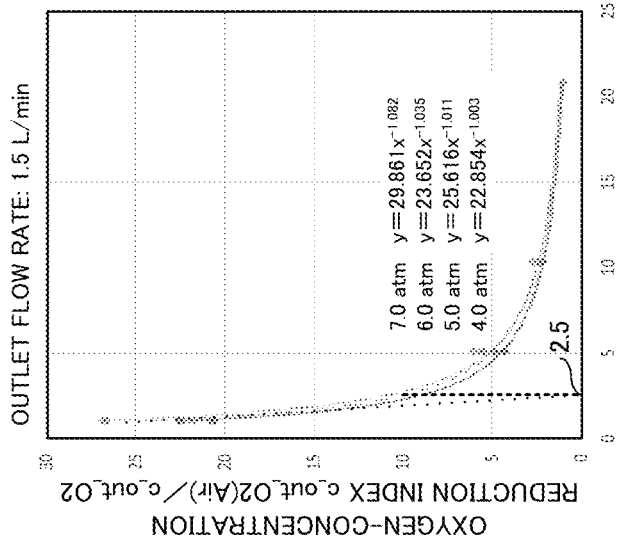
Figure 3C:
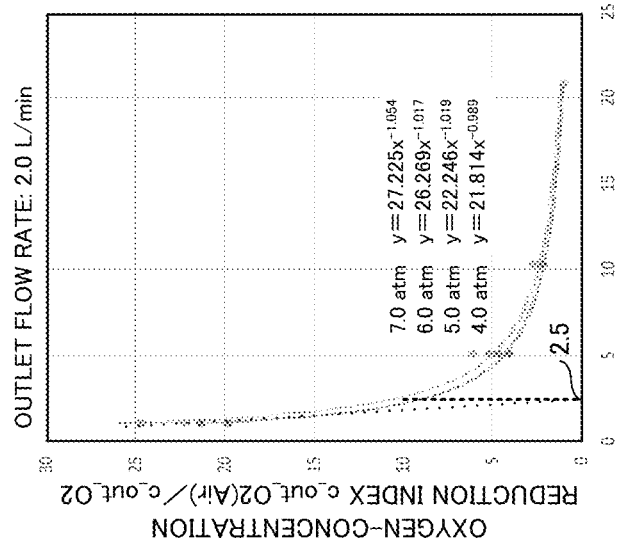

FIGS. 3A, 3B and 3C are graphs showing the relationship between the introduction oxygen concentration c_in_O2 and the oxygen-concentration reduction index under conditions of an outlet flow rate f_out of 2.0 L/min, 1.5 L/min, and 1.0 L/min, respectively. Here, four graph curves shown in each of these graphs are power approximation curves with respect to data points when the introduction pressure p_in is 4.0 atm (about 0.40 MPa), 5.0 atm (about 0.51 MPa), 6.0 atm (about 0.61 MPa) and 7.0 atm (about 0.71 MPa).

Here, setting, as c_out_O2 (Air), the outlet oxygen concentration when air having an oxygen concentration of 20.8 vol % is introduced into the nitrogen gas filter 12f, the oxygen-concentration reduction index is calculated by the following formula.

$$(\text{oxygen-concentration reduction index})=c\_out\_O2 \text{ (Air)}/c\_out\_O2 \quad (2)$$

That is, the oxygen-concentration reduction index is an index showing the degree of an absolute oxygen concentration reduction by filtering, that is, the magnitude of the filtering effect (relative to the case of air), based on the results of air introduced.

According to the graphs of FIGS. 3A, 3B and 3C, it is found that, (a) the oxygen-concentration reduction index is larger when the introduction oxygen concentration c_in_O2 is lower, and particularly, the rate of increase in the index sharply increases when the introduction oxygen concentration c_in_O2 exceeds 10 vol %, (b) the oxygen-concentration reduction index does not show a significant dependence on the introduction pressure p_in, and also (c) the oxygen-concentration reduction index does not show a significant dependence on the outlet flow rate f_out.

Here, 10 vol % of the introduction oxygen concentration c_in_O2, at which the rate of increase in the index in the above (a) began to rapidly increase, roughly corresponds to the oxygen concentration in the exhaust gas of the "fuel cell" having an oxygen utilization rate of 50%.

In addition, based on the above analysis results, it is understood that, for example, when trying to find a filtering condition in which the oxygen-concentration reduction index becomes 10, that is, a filtering effect is multiplied by 10, namely, one digit higher (compared to the case of air), regardless of set values of the introduction pressure p_in and the outlet flow rate f_out, the introduction oxygen concentration c_in_O2 should be 2.5 vol % or less. Here, the value 2.5 vol % of c_in_O2 is an average value of the introduction oxygen concentration values at which the oxygen-concentration reduction indexes in the four power approximation curves in each graph are 10. Incidentally, the horizontal axis intercept of the tangent line around 1.1 vol % of c_in_O2 of each curve of each graph is a value near 2.5 vol % (=c_in_O2).

Therefore, in the nitrogen gas generation apparatus (system) 1 of the embodiment shown in FIG. 1, when an exhaust gas having an oxygen concentration of 2.5 vol % or less is applied to the nitrogen gas filter 12f, it is possible to extract, from the filter 12f, an exhaust gas having an oxygen concentration that is ¹/₁₀ or less compared to the result obtained by introducing air. Here, it is confirmed by experiments that, even when the temperature of the gas introduced into the nitrogen gas filter 12f is 40° C. and 50° C., there is a general agreement with the results shown in the graphs of FIGS. 3A to 3C described above, particularly in the low oxygen concentration region.

<Introduction Pressure and Outlet Oxygen Concentration>

Next, the relationship between the introduction pressure p_in and the outlet oxygen concentration c_out_O2 will be described using the analysis results shown in FIG. 4.

Figure 4:
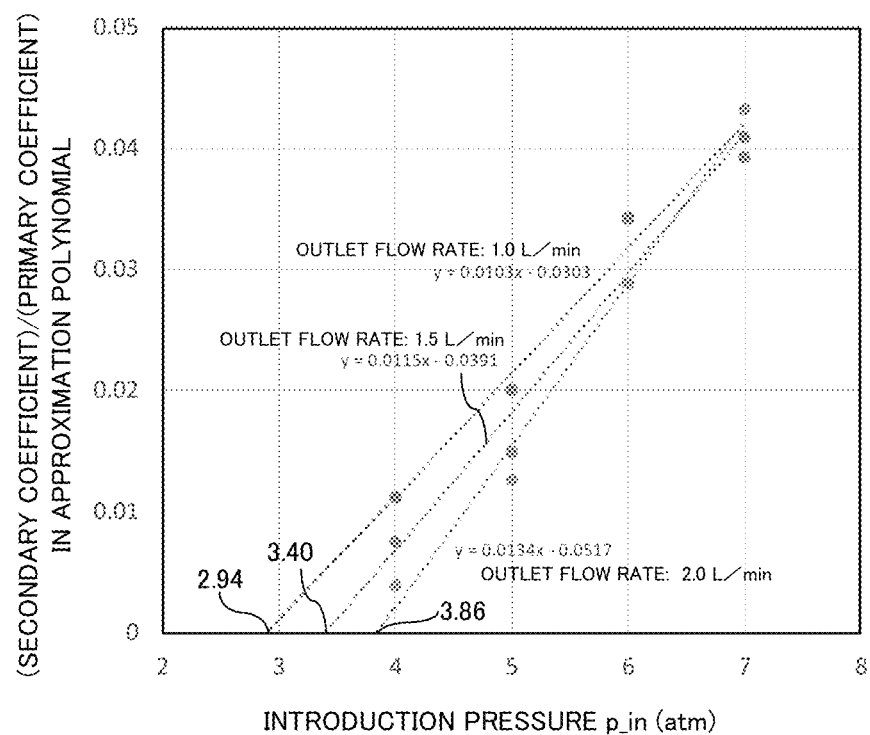
FIG. 4 is a graph illustrating Example 1 according to a nitrogen gas generation process of the present invention.

FIG. 4 is a graph showing the relationship between the introduction pressure p_in and (secondary coefficient)/(primary coefficient), which is derived after taking the ratio of the secondary coefficient to the primary coefficient in four polynomial (second-order) approximation formula corresponding to the four graph curves in each graph shown in FIGS. 2A to 2C.

In the graphs shown in FIGS. 2A to 2C, shown are four graph curves indicating the relationship between the introduction oxygen concentration c_in_O2 and the outlet oxygen concentration c_out_O2 when the introduction pressure p_in is 4.0 atm (about 0.40 MPa), 5.0 atm (about 0.51 MPa), 6.0 atm (about 0.61 MPa) and 7.0 atm (about 0.71 MPa). And in the vicinity of each graph curve, a polynomial (second-order) approximation formula corresponding to the graph curve is shown. For example, in the vicinity of the graph curve of p_in=7.0 atm (and f_out=1.0 L/min) in the graph of FIG. 2C, a polynomial approximation formula $$y=6.6246x^2+161.96 \quad (3)$$

Here, y is c_out_O2 (vol %) and x is c_in_O2 (vol %) is shown. In this formula, the secondary coefficient is 6.6246, and the primary coefficient is 161.96.

In this manner, it is found that the introduction oxygen concentration c_in_O2 not only contributes proportionally, as a primary term, to the outlet oxygen concentration c_out_O2 but also had an influence as a secondary term. That is, even if the introduction oxygen concentration c_in_O2 is reduced to 1/N, the outlet oxygen concentration c_out_O2 is not simply reduced to 1/N, but the secondary term of the introduction oxygen concentration c_in_O2 had an effect on the outlet oxygen concentration c_out_O2.

The graph of FIG. 4 is a graph obtained by calculating the (secondary coefficient)/(primary coefficient), which is a value of the ratio of the secondary coefficient to the primary coefficient as described above, in each of graph curves of the graphs of FIGS. 2A to 2C and then plotting these calculated values with the vertical axis representing (secondary coefficient)/(primary coefficient) and the horizontal axis representing the introduction pressure p_in.

According to the graph of FIG. 4, it is found that three graph curves (straight lines in FIG. 4) having an outlet flow rate f_out of 1.0 L/min, 1.5 L/min and 2.0 L/min are obtained, and thus the graph points in FIG. 4 could be approximated by a linear approximation formula determined for each outlet flow rate.

According to these graph curves (straight lines), when the introduction pressure p_in is larger and the outlet flow rate f_out is lower, the (secondary coefficient)/(primary coefficient) is larger. Therefore, it is found that the secondary term of the introduction oxygen concentration c_in_O2 described above contributes to the outlet oxygen concentration c_out_O2 becoming smaller.

And accordingly, it is understood that, in order to obtain a higher-purity nitrogen gas (make the outlet oxygen concentration c_out_O2 be lower), the ratio of the secondary term in the introduction oxygen concentration c_in_O2, that is, (secondary coefficient)/(primary coefficient), is preferably larger in the positive value, and it is important to at least set the value exceeding 0 (zero) at which contribution of the secondary term disappeared. That is, it is preferable to express a secondary term with a larger positive value.

Then, in the graph of FIG. 4, determined is the condition in which the (secondary coefficient)/(primary coefficient) becomes a value exceeding 0 (zero). It is found that the determined condition is that the introduction pressure p_in is a value exceeding 2.94 atm (about 0.298 MPa), 3.40 atm (about 0.344 MPa) and 3.86 atm (about 0.391 MPa) when the outlet flow rate f_out is 1.0 L/min, 1.5 L/min and 2.0 L/min, respectively. It is also understood that these pressure thresholds are values that are larger when the outlet flow rate f_out is larger. That is, when the outlet flow rate f_out is set smaller, the introduction pressure p_in could be set based on a smaller pressure threshold.

Further, according to the above analysis results, it is understood that, in the nitrogen gas generation apparatus (system) 1 of the embodiment shown in FIG. 1, the pressure (introduction pressure) of the exhaust gas applied to the nitrogen gas filter 12f preferably has a value exceeding a pressure threshold depending on the nitrogen gas filter 12f, the pressure threshold being a larger value when the flow rate (outlet flow rate) of the exhaust gas extracted from the nitrogen gas filter 12f is larger.

Example 2

Figure 5A:
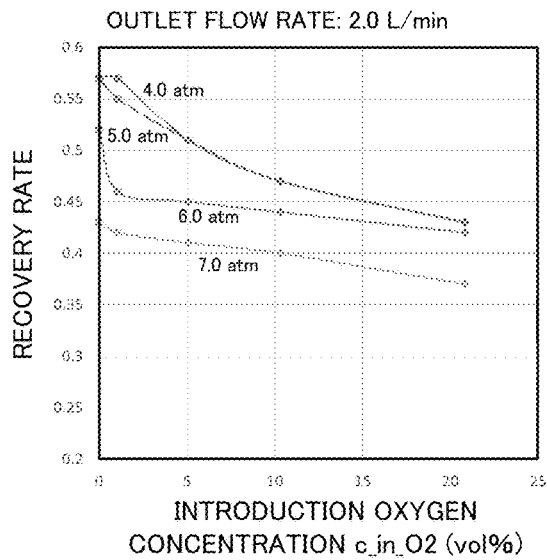
FIG. 5A, FIG. 5B and FIG. 5C are graphs illustrating Example 2 in which the recovery ratio of the nitrogen gas filter was examined in the nitrogen gas generation process according to the present invention.
Figure 5B:
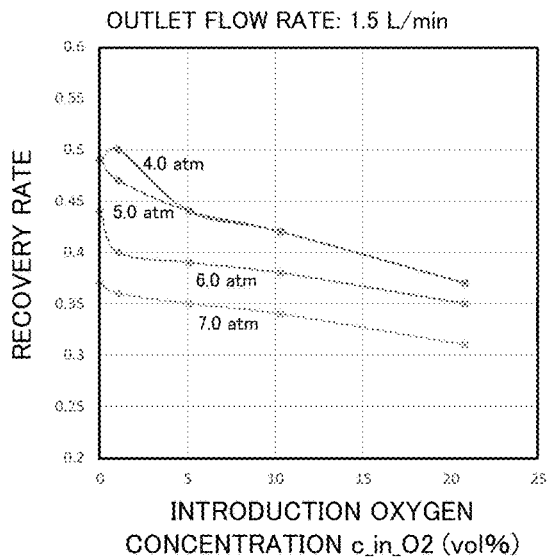
Figure 5C:
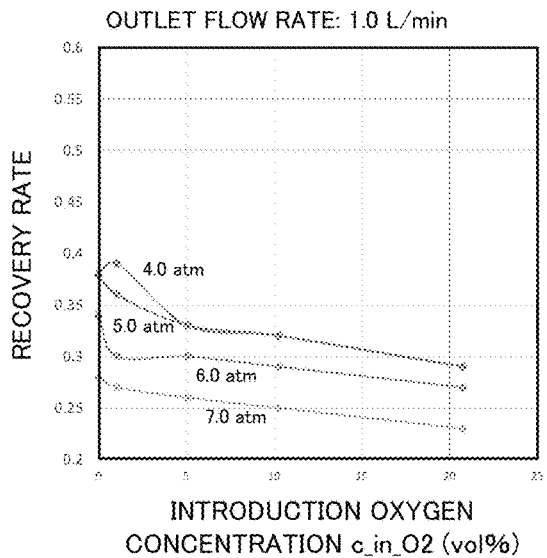

FIGS. 5a to 5C are graphs illustrating Example 2 in which the recovery ratio of the nitrogen gas filter 12f was examined in the nitrogen gas generation process according to the present invention.

Here, in Example 2, the same system as in Example 1 was used, and the same conditions as in Example 1 were set for the introduction oxygen concentration, the introduction pressure and the outlet flow rate, and then, the recovery ratio of the nitrogen gas filter 12f was measured. However, in Example 2, additionally performed was a measurement in which the introduction oxygen concentration c_in_O2 equals to 0 (zero), that is, a measurement in which the pure nitrogen gas was introduced into the filter 12f. Here, the recovery ratio, which is a measurement item of Example 2, is defined as a degree/level of gas recovery in the filter 12f. Namely, the recovery ratio is calculated according to the following formula.

$$(\text{recovery ratio}) = (f\_out)/(f\_in) \quad (4)$$

In the above formula, f_in is a flow rate (introduction flow rate) of the introduction gas at the inlet of the filter 12f.

FIGS. 5A, 5B and 5C are graphs showing the relationship between the introduction oxygen concentration c_in_O2 and the recovery ratio under conditions of an outlet flow rate f_out of 2.0 L/min, 1.5 L/min, and 1.0 L/min, respectively.

According to these graphs, it is found that the recovery ratio is larger (a) when the introduction oxygen concentration c_in_O2 is lower (although it may slightly deviate under the condition of 4.0 atm (about 0.40 MPa)), (b) when the introduction pressure p_in is lower (although the difference between 4.0 atm (about 0.40 MPa) and 5.0 atm (about 0.51 MPa) is very small), and (c) when the outlet flow rate f_out is larger (this is highly probable from the definition of the recovery ratio).

For example, under the conditions of the above (a) to (c), a larger amount of nitrogen gas (exhaust gas having a reduced oxygen concentration) is acquired even if an exhaust gas having a given limited flow rate is introduced into the nitrogen gas filter 12f.

Here, in the introduction oxygen concentration c_in_O2 in the above (a), a direction in which the recovery ratio increases and a direction in which the outlet oxygen concentration c_out_O2 decreases (as shown in FIGS. 2A to 2C, for example) matches. Specifically, when the introduction oxygen concentration c_in_O2 is lower, the outlet oxygen concentration is further reduced and the recovery ratio could be larger. Therefore, it is more preferable to use a nitrogen gas filter in which the recovery ratio is larger when the oxygen concentration of the gas to be filtered is lower, in order to generate a larger amount of higher-purity nitrogen gas.

Further accordingly, it is understood that the "fuel cell" that outputs an exhaust gas having a low oxygen concentration and the "nitrogen gas filter" as described above that uses the exhaust gas are very compatible, considering both the outlet oxygen concentration and the recovery ratio, and thus a system in which they are combined could efficiently generate nitrogen gas.

On the other hand, in the introduction pressure p_in in the above (b) and the outlet flow rate f_out in the above (c), a direction in which the recovery ratio increases (for example, as shown in FIGS. 2A to 2C) and a direction in which the outlet oxygen concentration c_out_O2 decreases are opposite to each other. That is, there is a so-called tradeoff relationship between the recovery ratio and the outlet oxygen concentration c_out_O2.

Therefore, for example, when the introduction pressure p_in is larger, a high-purity nitrogen gas having a lower oxygen concentration could be obtained, and on the other hand, the amount of exhaust gas required to obtain a predetermined amount of nitrogen gas, and eventually, the required amount of air put into the "fuel cell" increases.

Therefore, in order to realize a desired low outlet oxygen concentration c_out_O2 and secure a predetermined recovery ratio according to performance content of the nitrogen gas output set in the nitrogen gas generation apparatus (system) 1 (FIG. 1), it is preferable to adjust setting of the introduction pressure p_in and the outlet flow rate f_out. For example, in order to realize a performance content in which a high-purity nitrogen gas having a predetermined concentration or larger (for example, 99.9 vol % or more) is produced at a predetermined generation cost (for example, equal to or less than a generation cost in a PSA apparatus to be described below), it is preferable to determine the introduction pressure p_in and the outlet flow rate f_out (and, additionally, the recovery ratio depending on them) while controlling them.

Regarding the above-described tradeoff relationship between the recovery ratio and the outlet oxygen concentration c_out_O2 in the introduction pressure p_in in the above (b), the inventors of the present invention think that, in the nitrogen gas filter 12f of Example 2 (Example 1) in which filter fibers are hollow fibers, the hollow fibers expands more when the introduction pressure p_in is larger, and thus changed is not only oxygen molecule selectivity of the filter fibers but also permeability with respect to molecules other than oxygen molecules.

In addition, regarding the recovery ratio described above, the inventors of the present invention have confirmed that the recovery ratio is lower when the temperature of the gas introduced into the nitrogen gas filter 12f is higher, and the recovery ratio is significantly reduced at a predetermined temperature or higher. Therefore, in the nitrogen gas generation apparatus (system) 1 (FIG. 1), the temperature control U 126 (FIG. 1) installed at the front stage of the nitrogen filter U 12 preferably controls the temperature of the exhaust gas in consideration of securing a predetermined recovery ratio in the nitrogen gas filter 12f.

Here, regarding the influence of the temperature of the introduction gas on the recovery ratio, the inventors of the present invention also think that the hollow fibers of the nitrogen gas filter 12f expands more when the temperature is higher, and thus changed is not only oxygen molecule selectivity of the filter fibers but also permeability with respect to molecules other than oxygen molecules.

With reference to FIG. 2A to FIG. 5C, Examples 1 and 2 have been explained above. Based on the findings obtained from these experiments, the inventors of the present invention have succeeded in generating a high-purity nitrogen gas having a purity (nitrogen concentration) exceeding 99.9 vol % and an oxygen concentration of less than 0.1 vol % (1,000 ppm vol) using the nitrogen gas generation apparatus (system) 1. Such a high-purity nitrogen gas could be used in a reflow soldering apparatus with strict purity-related conditions. In the reflow soldering apparatus, depending on the type of a solder paste used, nitrogen gas having a purity (nitrogen concentration) of 99 vol % could be used.

Of course, the demand for nitrogen gas is not limited to the fields of electronic devices and electrical devices where soldering apparatuses are used. Actually, nitrogen gas is used for various applications in various fields such as metal/resin fields in which nitrogen gas is used when laser machining, a heat treatment or the like is performed, transportation equipment fields where nitrogen gas is required for tire filling, an inboard purging device or the like, fields of chemistry where nitrogen gas is used as various process gases, a pressure transport gas, a cooling gas or the like, fields of machinery in which nitrogen gas is required for a dry cut device or the like, and also fields of food where nitrogen gas is used for food preservation, gas filling, and is used in a CA (controlled atmosphere) storage atmosphere supply apparatus or in a flyer apparatus.

Therefore, the required purity (nitrogen concentration) of nitrogen gas also varies depending on the fields and applications. For example, there are cases in which the concentration of oxygen gas (oxygen concentration) as an impurity gas is required to be on the order of 0.01 vol % (100 ppm vol), and there are also cases in which the oxygen concentration can be acceptable up to several vol %.

In response to this situation, according to the present nitrogen gas generation apparatus (system) 1, the introduction oxygen concentration c_in_O2, the introduction pressure p_in and the outlet flow rate f_out, for example, are adjusted so that it is possible to appropriately provide nitrogen gas in which the residual oxygen is reduced to a required upper limit oxygen concentration. For example, in the case in which the oxygen concentration may be about several vol %, the introduction oxygen concentration c_in_O2 is set to, for example, 10 vol %, the introduction pressure p_in is kept lower, the outlet flow rate f_out is set to be larger, and thus the recovery ratio can increase.

In addition, according to the present nitrogen gas generation apparatus (system) 1, it is possible to provide, as well as the generated nitrogen gas, electric power and heat required at the same time depending on their fields and applications. Of course, in the conventional nitrogen gas generation apparatus, it is difficult or impossible to cover such an energy supply.

Further, based on the findings described above, the inventors of the present invention have confirmed that, according to the nitrogen gas generation apparatus (system) 1 of the present invention, it is also possible to significantly reduce a nitrogen gas generation cost. For example, according to the examination by the inventors of the present invention, currently, the sales price of the nitrogen gas cylinder is, for example, about 430 yen/$Nm^3$, and the sales price of liquid nitrogen is, for example, about 120 yen/$Nm^3$. In addition, according to a pressure swing adsorption (PSA) apparatus, which is a widely used nitrogen gas generation apparatus, the nitrogen gas generation cost is, for example, about 48 yen/$Nm^3$.

On the other hand, it has been confirmed by preliminary calculation that, according to the nitrogen gas generation apparatus (system) 1, based on an appropriate condition setting including a standard output and a possible exhaust gas flow rate of the "fuel cell" and also an expected hydrogen procurement cost, it is possible to realize a generation cost that is equal to or less than the generation cost in the PSA apparatus described above, for example. In addition, as described above, in the case in which the nitrogen gas generation apparatus (system) 1 provides electric power and heat (to be required), the total procurement cost including these can be significantly reduced compared to that in the conventional art.

Another Embodiment in Dehumidification Mechanism: Water Seal Pump U

FIGS. 6A and 6B are a schematic view illustrating another embodiment in the dehumidification mechanism according to the present invention.

First, FIG. 6A shows the water seal pump U 30 that receives an exhaust gas extracted from the side of the air electrode (the drain 112) of the "fuel cell" of the fuel cell U 11 via a flow control valve, reduces the moisture or water vapor content in the exhaust gas, and sends the exhaust gas that has undergone such a dehumidifying treatment toward the off-gas buffer tank 123.

The water seal pump U 30 includes the water seal pump 301 which is a water sealing vacuum pump, and a gas-liquid separation tank 302, and also incorporates a heat exchanger (which is a part of a heat exchange U (unit) 40) for cooling a circulating sealing liquid.

Among these, the water seal pump 301 is a vacuum pump in which (a) a sealing liquid (sealing water) contained in the pump caging forms a crescent-shaped water film inside the pump due to a centrifugal force caused by eccentric rotation of an impeller 301a, which is a vane wheel, and (b) the volume of the enclosed space formed between the sealing liquid water film and two adjacent blades of the impeller 301a periodically changes due to eccentric rotation of the impeller 301a, so that the sealing liquid water film plays a role of a piston and a seal, and specifically, a series of processes in which an exhaust gas is sucked into the caging, compressed in the caging, and then discharged to the outside of the caging together with the sealing liquid is activated.

Of course, the structure of the water seal pump 301 is not limited to that shown in FIG. 6A, and any of various structures can be used as the structure as long as it is a structure related to the water seal pump.

The gas-liquid separation tank 302 is a water storage tank in which a mixture containing the exhaust gas discharged from the water seal pump 301 and the sealing liquid is received, the moisture/water vapor content in the exhaust gas and the sealing liquid are separated from the exhaust gas, and the separated sealing liquid (including the moisture/water vapor content) is stored. Here, the stored sealing liquid returns to the water seal pump 301 (via a heat exchanger which is a part of the heat exchange U 40) by a pump and is used again. When the amount of the stored sealing liquid is a predetermined amount or more, a part thereof is discharged as overflowed water to the outside of the tank.

In the water seal pump 301, since the impeller 301a rotates at a high speed by the motor, generally the temperature of the sealing liquid increases due to the frictional heat, and the sealing liquid may boil if it is not cooled. Therefore, for example, when the sealing liquid is equal to or higher than a predetermined temperature (for example, 50° C.), the sealing liquid is cooled through a heat exchanger (which is a part of the heat exchange U 40).

The heat exchange U 40 adjusts (cools) the temperature of the sealing liquid in the water seal pump U 30 in this manner, but in the embodiment shown in FIG. 6A, additionally, another heat exchanger which is a part of the heat exchange U 40 is applied to the fuel cell U 11, and the temperature of the "fuel cell" is adjusted (cooled).

That is, in the heat exchange U 40, the heat exchanger incorporated into the water seal pump U 30 and the heat exchanger incorporated into the fuel cell U 11 are arranged in series, and for example, using a common chiller and pump, it is possible to receive heat from the sealing liquid and the "fuel cell" and adjust (cool) their temperatures all at once. As an alternative, both heat exchangers may be arranged parallel to each other to adjust (cool) the temperatures all at once. Of course, it is also possible to control both heat exchangers independently. In addition, the heat exchange U 40 may supply the heat recovered in this manner to an external apparatus or facility, or, for example, the recovered heat may be used for cooling and heating in a facility in which the apparatus (system) 1 is installed. Here, in this case, the chiller can be omitted.

Even if the outlet pressure on the side of the air electrode of the "fuel cell" is a "low pressure" near atmospheric pressure (about 0.1 MPa), for example, the water seal pump 301 described above can suck the exhaust gas according to its vacuum pump operation, perform a dehumidifying treatment thereon, and transfer the result to the off-gas buffer tank 123. Here, in such a case of "low pressure," the outlet pressure on the side of the air electrode of the "fuel cell" falls below 1 atm (about 0.1 MPa) according to the sucking action of the water seal pump 301, and as a result, it is expected that the gas after the fuel cell reaction in the cell of the "fuel cell" is actively drawn, and thus the power generation efficiency of the "fuel cell" is improved.

In this manner, the water seal pump 301 is very suitable for combination with the "fuel cell". Actually, when a dehumidifying treatment is performed on the exhaust gas of the "fuel cell", in which the outlet pressure is 1.2 atm (about 0.12 MPa) and the relative humidity is about 100%, by using a water sealing vacuum pump LEH100SMS (commercially available from KASHIYAMA Industries, Ltd.), an exhaust gas having a relative humidity similar to the typical value in the atmosphere, that is several tens of %, is obtained, and also it can be stored in the tank 123 quickly.

Incidentally, when the vacuum pump operation of the water seal pump 301 is too strong, the gas in the cell of the "fuel cell" may be drawn too much, which may hinder the fuel cell reaction. Therefore, it is preferable to adjust the rotation speed of the impeller 301a in the water seal pump 301 so that the transfer flow rate with respect to the off-gas buffer tank 123 does not exceed a reference value of the introduction flow rate. Further, in order to appropriately perform such adjustment, it is preferable to install a flow meter and a pressure gauge immediately before the intake port and immediately behind the extraction port of the water seal pump U 30, and monitor the flow rate and the pressure of the exhaust gas.

Next, in the embodiment shown in FIG. 6B, an adiabatic expansion chamber 50 is provided between the fuel cell U 11 and the water seal pump U 30. Here, the exhaust gas extracted from the side of the air electrode of the "fuel cell" via a flow control valve is taken in the adiabatic expansion chamber 50 with a suction force of the water seal pump 301. At that time, the taken exhaust gas is discharged at once from the outlet pipe on the side of the air electrode into the adiabatic expansion chamber 50, which has a predetermined chamber volume, so that it expands adiabatically and lowers its own temperature. As a result, a part of the moisture/water vapor content contained in the exhaust gas condenses due to a decrease in the saturated water vapor density and accumulates in the lower part of the adiabatic expansion chamber 50. Here, when a vacuum pump operation (the rotation speed of the impeller 301a) of the water seal pump 301 is strengthened within a predetermined limit, and the flow control valve adjusts the flow rate of the exhaust gas flowing into the adiabatic expansion chamber 50 to cause a sharp drop in the pressure of the exhaust gas, the degree of adiabatic expansion becomes larger, and thus the dehumidification effect due to condensation is improved. For example, it is possible to lower the temperature of the exhaust gas by a level of several tens of ° C., condense a large amount of water vapor content, and exclude it from the exhaust gas.

In this manner, the adiabatic expansion chamber 50 functions as an exhaust gas dehumidification mechanism in front of the water seal pump U 30. Here, in this case, the water seal pump U 30 takes in the exhaust gas having a reduced moisture/water vapor content after adiabatic expansion, and further reduces the moisture/water vapor content in the exhaust gas. That is, when the adiabatic expansion chamber 50 is provided, it is possible to send an exhaust gas having a further lower relative humidity to the off-gas buffer tank 123.

Further, in the present embodiment, there is provided a heat exchange U 60 in which
  (a) a heat exchanger incorporated into the water seal pump U 30, a heat exchanger (in FIG. 6B, a tube bundle 501) installed in the adiabatic expansion chamber 50, and a heat exchanger incorporated in the fuel cell U 11 are arranged in series (or parallel), and
  (b) heat is received from the sealing liquid of the water seal pump U 30 and the "fuel cell" and the heat is transferred to the adiabatic expansion chamber 50, and the temperatures of the sealing liquid, the adiabatic expansion chamber 50 and the "fuel cell" are adjusted at once.

The heat exchange U 60 also adjusts the temperature using a chiller and pump, but since a heat exchange medium is cooled in the adiabatic expansion chamber 50, a low-consumption-power chiller and pump can be used. Of course, in the heat exchange U 60, the heat recovered in this manner may be supplied to an external apparatus or facility. Or for example, the recovered heat may be used for cooling and heating in a facility in which the apparatus (system) 1 is installed. Also in this case, the chiller can be omitted.

As a modified embodiment, in the heat exchange U 60, the heat exchanger in the "fuel cell" can be omitted, and the heat exchange U 60 can also be used as a heat transfer mechanism that removes heat from the sealing liquid of the water seal pump U 30 and transfers heat to the adiabatic expansion chamber 50. Also in this case, it is possible to omit the chiller or reduce the power consumption.

As a further another embodiment in which the adiabatic expansion chamber 50 is used as a dehumidification mechanism, the water seal pump U 30 is omitted in the configuration of FIG. 6B, and additionally, (a) the pressure of the exhaust gas from the "fuel cell" of the fuel cell U 11 is set to a pressure exceeding atmospheric pressure (1 atm, about 0.1 MPa), for example, a pressure equal to or larger than 3 atm (about 0.3 MPa) (that is, the "fuel cell" is driven under a high pressure using the pressure control U 121 and the pressure control U 113 (FIG. 1)), and (b) such a high-pressure exhaust gas is discharged into the adiabatic expansion chamber 50 to be released from the high-pressure state, and thus a considerable amount of the moisture/water vapor content in the exhaust gas is removed.

In this case, without using the water seal pump U 30 that requires driving power, it is possible to reliably proceed the dehumidifying treatment on the exhaust gas.

With reference to FIGS. 6A and 6B, the dehumidification mechanism using the water seal pump 301 has been described above. In any of the embodiments shown in both drawings, at least a part of the electric power for driving the water seal pump U 30 and the chiller and pump can be supplied from the "fuel cell", and additionally, of course, may be supplied from the natural energy power generation U 101 (FIG. 1) and the power storage U 101s (FIG. 1). Further, it is preferable to provide a pure water recovery mechanism (specifically, for example, pipes, a pump and a filter) that recovers water discharged from the "fuel cell", (overflowed) water extracted from the adiabatic expansion chamber 50 (in the case of FIG. 6B), and also overflowed water (in case that its purity is high) of the gas-liquid separation tank 302, and provide the recovered water as pure water or high-purity water to the outside. In this case, the present apparatus (system) 1 also functions as a pure water supply apparatus (system).

One Embodiment of Gas-Liquid Separation U: Dry Filter

FIG. 7 is a schematic view illustrating one embodiment in the gas-liquid separation U 122 as the dehumidification mechanism according to the present invention.

In the embodiment shown in FIG. 7, the gas-liquid separation U 122 is a dry filter unit using the dry filter 122f. The dry filter 122f is a filter which can (a) receive an exhaust gas having a pressure exceeding atmospheric pressure (1 atm, about 0.1 MPa), for example, a pressure of 3 atm (about 0.3 MPa) or more, (b) sharply change the flow direction of the exhaust gas in the lower part of the container and separate moisture, oil, and a micro mixture in the exhaust gas, (c) filter the exhaust gas, the direction of which has changed and which has entered a mesh tube 122f1, with a mesh of the mesh tube 122f1 and a hollow fiber filter (permeates more water vapor than air) therein, and remove the fine particle/moisture/water vapor content in the exhaust gas, and (d) evaporate moisture in the exhaust gas by the heat generated during filtering.

Here, the moisture/water vapor content extracted from the exhaust gas may be discharged to the outside of the filter 122f via a drain 122f2, and this may be supplied to the outside as pure water or high-purity water. In any way, the structure of the dry filter 122f is not limited to that shown in FIG. 7, and various known dry filter structures can be used as the structure.

In the present embodiment as shown in FIG. 7, in order to supply an exhaust gas having a high pressure (for example, 3 to 7 atm (about 0.3 to 0.7 MPa)) to the dry filter 122f, there is provided a mechanism in which (a) using the pressure control U 121 and the pressure control U 113, air (or a gas containing nitrogen and oxygen) having a high pressure (for example, 3 to 7 atm (about 0.3 to 0.7 MPa)) and hydrogen (fuel gas) having a high pressure (for example, 3 to 7 atm (about 0.3 to 0.7 MPa)) are supplied to the "fuel cell", and (b) an exhaust gas having a high pressure (for example, 3 to 7 atm (about 0.3 to 0.7 MPa)) is extracted from the "fuel cell" and is sent to the dry filter 122f.

As just described, the "fuel cell" with high pressure specification and the dry filter 122f are a very suitable combination, that is, a high-pressure system as a series of the "fuel cell" and the dry filter 122f can remove the generated moisture/water vapor content efficiently while promoting the efficiency of the cell reaction.

Further in the present embodiment, the exhaust gas discharged from the dry filter 122f, which has a reduced moisture or water vapor content and a high pressure, is sent toward the nitrogen filter U 12 without passing through (or it may pass through) the off-gas buffer tank 123. Here, in the nitrogen gas filter 12f of the nitrogen filter U 12, as described above, when the pressure of the exhaust gas to be applied is higher, the oxygen concentration of the output exhaust gas is lower, that is, a higher-purity nitrogen gas is obtained. Therefore, it is understood that the dry filter 122f and the nitrogen filter U 12 are also a very suitable combination that forms a high-pressure system of a series of them.

Another Embodiment of Nitrogen Filter U

Hereinafter, another preferable embodiment of the nitrogen filter U 12 will be described. As described above, the nitrogen filter U 12 shown in FIG. 1 includes a filter purging unit that extracts a "filter exhaust gas" containing oxygen molecules separated from nitrogen molecules (in the exhaust gas) by permeation through hollow fibers of the nitrogen gas filter 12f. Here, since the "filter exhaust gas" discharged from the filter purging unit contains a considerable amount of oxygen molecules in this manner, it becomes a gas that can be used again in the fuel cell reaction or can be filtered again.

In the case that the UBE $N_2$ separator NM-B01A (commercially available from Ube Industries, Ltd.) was used as the nitrogen gas filter 12f, a gas having an oxygen concentration of 10.2 vol % was introduced into the nitrogen gas filter 12f under conditions of an introduction pressure of 6.0 atm (about 0.61 MPa) and an outlet flow rate of 1.0 L/min, and then the oxygen concentration of the filter exhaust gas discharged therefrom was examined. As the experiment result, an oxygen concentration of 14.9 vol % was obtained and a recovery ratio of 0.29 was obtained. In addition, it is confirmed by the experiments that the oxygen concentration of the filter exhaust gas is higher (a) when the introduction oxygen concentration is larger, (b) when the introduction pressure is lower, and (c) when the outlet flow rate is larger.

Here, assuming that almost all oxygen molecules of the introduced gas are discharged from the filter purging unit of the nitrogen gas filter 12*f* (this is probable because the oxygen concentration at the outlet of the filter 12*f* is an order of magnitude smaller), the calculation result of the oxygen concentration of the filter exhaust gas, using the recovery ratio (0.29) obtained in the above-described experiment, is 0.102/0.71=14.4, which is almost the same as 14.9 vol % obtained in the above-described experiment. Therefore, it is found that almost all of the oxygen gas content separated as an unnecessary component could be recovered from the filter purging unit of the nitrogen gas filter 12*f*.

Accordingly, the nitrogen gas generation apparatus (system) 1 of the present embodiment includes a gas return flow path as indicated by the "circled "B"" in FIG. 1, and
(a) sends the filter exhaust gas back to the flow control U 109 installed at the front stage of the side of the air electrode of the fuel cell" and uses it as a gas containing oxygen and nitrogen in the "fuel cell" again, and/or
(b) sends it back to the off-gas buffer tank 123 installed in front of the nitrogen filter U 12 and applies it to the nitrogen gas filter 12*f* again together with the exhaust gas.

Thereby, it is possible to effectively use the oxygen gas content and to extract nitrogen gas having a lower oxygen concentration.

Here, if the filter exhaust gas having a lower oxygen concentration than air is used again in the "fuel cell", the exhaust gas of the "fuel cell" can become an exhaust gas having a lower oxygen concentration. And thereby, since the recovery ratio becomes larger in the nitrogen gas filter 12*f* into which such an exhaust gas is introduced (as described with reference to FIGS. 5*a* to 5C), it is possible to finally extract a larger amount of nitrogen gas. And, it is also possible to significantly reduce a nitrogen gas generation cost by increasing the final recovery ratio in the nitrogen gas filter 12*f* in this manner, although it depends on setting of various conditions in the nitrogen gas generation apparatus (system) 1.

Incidentally, it is found that, under conditions in which the oxygen concentration of the exhaust gas from the "fuel cell" is about 15 vol % and also the oxygen concentration of the filter exhaust gas is, as a typical value for example, 1.4 times larger than the introduction oxygen concentration $c\_in\_O2$, the oxygen concentration of the filter exhaust gas becomes equal to or higher than that of air (20.8 vol %), and as a result, the above advantage of sending the filter exhaust gas back to the side of the air electrode of the "fuel cell" does not occur.

On the other hand, when the oxygen concentration of the filter exhaust gas is also 1.4 times larger than the introduction oxygen concentration, and the oxygen concentration of the exhaust gas from the "fuel cell" is about 10 vol %, the oxygen concentration of the filter exhaust gas is around 14 vol % (<20.8 vol %), and the above sending back of the filter exhaust gas becomes significant. Further, when the oxygen concentration of the exhaust gas from the "fuel cell" is about 5 vol %, the oxygen concentration of the filter exhaust gas is around 7 vol %, which is expected to improve the recovery ratio. And depending on the system settings, the economic effect of significantly reducing the nitrogen gas generation cost can also be achieved.

Figure 8:
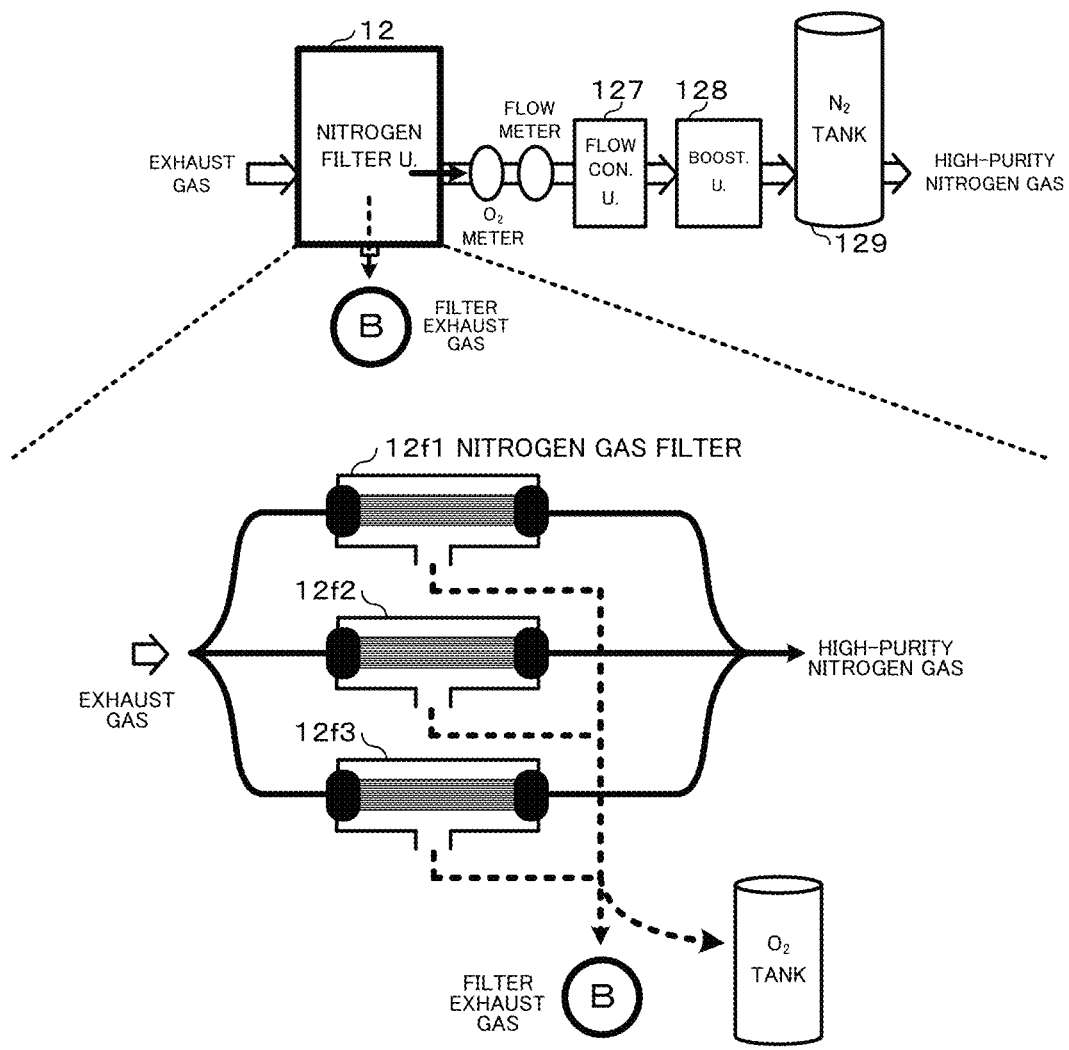
FIG. 8 is a schematic view illustrating another embodiment of the filtering mechanism according to the present invention.

Hereinafter, further another embodiment of the nitrogen filter U 12 will be described. FIG. 8 is a schematic view illustrating another embodiment of the filtering mechanism according to the present invention.

According to the embodiment shown in FIG. 8, the three nitrogen gas filters 12*f*1, 12*f*2 and 12*f*3 are installed in the nitrogen filter U 12 so that they are connected in parallel. Of course, the number of nitrogen gas filters connected in parallel is not limited to 3, and may be 2 or 4 or more.

Specifically, the exhaust gas supplied to the nitrogen filter U 12 is split, and taken in each of the three nitrogen gas filters 12*f*1, 12*f*2 and 12*f*3. Each nitrogen gas filter acts on an amount of the supplied exhaust gas which itself (the each nitrogen gas filter) takes in and generates a gas having an increased nitrogen concentration, that is, a high-purity nitrogen gas, and finally, these high-purity nitrogen gases merge, and are sent toward the nitrogen tank 129.

Further, the filter exhaust gas discharged from each of the three nitrogen gas filters 12*f*1, 12*f*2 and 12*f*3 is preferably sent back to the flow control U 109 (FIG. 1) at the front stage of the "fuel cell", and/or to the off-gas buffer tank 123 (FIG. 1) at the front stage of the nitrogen filter U 12 (FIG. 1), and reused. In addition, when the oxygen concentration in the filter exhaust gas discharged from these nitrogen gas filters is equal to or larger than a predetermined value, the filter exhaust gas may be sent to an external oxygen tank and held and stored. In any case, according to such a treatment, the oxygen gas content can be more effectively used, and nitrogen gas having a lower oxygen concentration can be extracted.

Further, the above-described filter treatment using a plurality of nitrogen gas filters arranged parallel to each other makes it possible to take in a large amount of exhaust gas at the same time and provide a larger amount of high-purity nitrogen gas to the outside. For example, according to catalog values of a 4-inch diameter nitrogen gas filter (commercially available from Daicel-Evonik Ltd.), when receiving air of 7 atm (about 0.7 MPa) at a flow rate of 40 L/min, the 4-inch diameter nitrogen gas filter discharges a high-purity nitrogen gas having an oxygen concentration of about 0.1 vol % at a flow rate of about 10 L/min under the condition that the recovery ratio is about 0.25.

For example, in the case that three such nitrogen gas filters are arranged parallel to each other, and an exhaust gas (having a lower oxygen concentration than air, for example, an oxygen concentration of 5 to 10 vol %) is put into each nitrogen gas filter at 7 atm (about 0.7 MPa) and at a flow rate of 40 L/min, it is possible to provide a high-purity nitrogen gas having an oxygen concentration in the 0.01 vol % (100 ppm vol) range or an oxygen concentration that is far below 0.1 vol % (1000 ppm vol) to the outside at a total flow rate of about 30 (=10×3) L/min.

Here in this case, since the exhaust gas flows into each nitrogen gas filter at a flow rate that is one third of the original total flow rate 120 (=40×3) L/min, the oxygen separation ability of each nitrogen gas filter is further improved compared to the case that one nitrogen gas filter is used. Of course, when a nitrogen gas filter having a larger diameter (for example, 6-inch diameter) is used, it is possible to supply a larger amount of high-purity nitrogen gas. Further for example, in a selective type 6-inch diameter nitrogen gas filter (commercially available from Daicel-Evonik Ltd.), the recovery ratio is about 0.32, which is significantly improved compared to the recovery ratio (about 0.25) of the 4-inch diameter nitrogen gas filter, and a larger amount of high-purity nitrogen gas can be provided to the outside accordingly.

Also in the present embodiment, it is preferable that the total control U 131 (FIG. 1) constantly monitors an oxygen concentration, a pressure and a flow rate of the exhaust gas from the "fuel cell" and additionally an introduction oxygen concentration, an introduction pressure, an introduction flow rate, an introduction gas temperature, an outlet oxygen concentration, an outlet pressure, an outlet flow rate and the like in each nitrogen gas filter, and controls individual units in a timely manner so that it is possible to provide a predetermined amount (predetermined flow rate) of nitrogen gas having a predetermined high nitrogen concentration.

[Control by Machine Learning]

Hereinafter, there will be described a control using machine learning for generating a nitrogen gas in the nitrogen gas generation apparatus (system) 1 in which the water seal pump U 30 (FIG. 6A) is used as a dehumidification mechanism according to the present invention, the exhaust gas that has been dehumidified in the water seal pump U 30 is converted into a high-purity nitrogen gas using the nitrogen filter U 12 (FIG. 1). Here, this control can be performed in the total control U 131 (FIG. 1).

First, it is considered that the nitrogen gas generation apparatus (system) 1, which generates a high-purity nitrogen gas using air and hydrogen taken in, is in a stable operation state. There is prepared a large number of data sets of measured values, obtained in the stable operation state, concerning, for example,
- (a) the introduction flow rate of air with respect to the "fuel cell" in the fuel cell U 11 (FIG. 1),
- (b) the complex impedance value between the hydrogen electrode and the air electrode of the "fuel cell",
- (c) the temperature of the "fuel cell",
- (d) the power generation amount of the "fuel cell",
- (e) the outlet flow rate of the exhaust gas on the side of the air electrode of the "fuel cell",
- (f) the outlet pressure of the exhaust gas on the side of the air electrode of the "fuel cell",
- (g) the rotation speed (or driving power) of the impeller 301*a* in the water seal pump 301,
- (h) the temperature of the sealing liquid at a position of the water seal pump 301 or a position of the gas-liquid separation tank 302,
- (i) the relative humidity of the exhaust gas at the discharge port of the water seal pump U 30,
- (j) the temperature of the introduction exhaust gas in the nitrogen filter U 12,
- (k) the pressure of the introduction exhaust gas in the nitrogen filter U 12,
- (l) the outlet flow rate (of nitrogen gas) in the nitrogen filter U 12, and
- (m) the outlet oxygen concentration (of nitrogen gas) in the nitrogen filter U 12.

Then, using these data sets, a nitrogen gas generation model based on, for example, a Deep Neural Network (DNN) algorithm is constructed. Thereby, a control program incorporating the constructed model preferably controls the operation state of the nitrogen gas generation apparatus (system) 1. In the constructed nitrogen gas generation model, the above (a) to (k) can be set as explanatory variables, and the above (l) and (m) can be set as objective variables, for example.

By inputting, to the constructed model, information on the operation state of the fuel cell U 11, the water seal pump U 30 and the nitrogen filter U 12, it is possible to know or predict, as the performance of the apparatus (system) 1,
- (l') a supply flow rate of a high-purity nitrogen gas that can be supplied to the outside, and
- (m') a purity (or an oxygen concentration) of the high-purity nitrogen gas that can be supplied to the outside. Here, as explanatory variables for model construction and performance prediction, at least the above (a) and (g) are preferably used. In addition, either the above (l) or (m) may be set as an objective variable.

As another modified embodiment, a nitrogen gas generation control model in which the above (b) to (f) and the above (h) to (m) are set as explanatory variables and the above (a) and (g) are set as objective variables can be constructed. A control program incorporating the constructed control model enables to control the operation state of the nitrogen gas generation apparatus (system) 1. Thereby, it is possible to obtain
- (a) the introduction flow rate of air with respect to the "fuel cell" and
- (g) the rotation speed (or driving power) of the impeller 301*a* in the water seal pump 301 which are necessary to achieve a target supply flow rate and a target purity (or an oxygen concentration) in the high-purity nitrogen gas to be supplied. And thus, the target can be achieved by performing control according to those obtained. Here, at least either the above (l) or (m) is preferably used as an explanatory variable for model construction and control amount prediction. In addition, either the above (a) or (g) may be set as an objective variable.

As already mentioned, the requirements of nitrogen gas users for the purity and supply amount (flow rate) of nitrogen gas very depending on the fields and specific applications. In some cases, the total control U 131 (FIG. 1) preferably constructs nitrogen gas generation models and nitrogen gas generation control models differently according to the requirements of such individual users, and preferably causes the nitrogen gas generation apparatus (system) 1 to exhibit high performance that satisfies the user's requirement using a control program incorporating the constructed model suitable for the performance desired by the user.

Another Embodiment Using Catalyst Combustion

Figure 9:
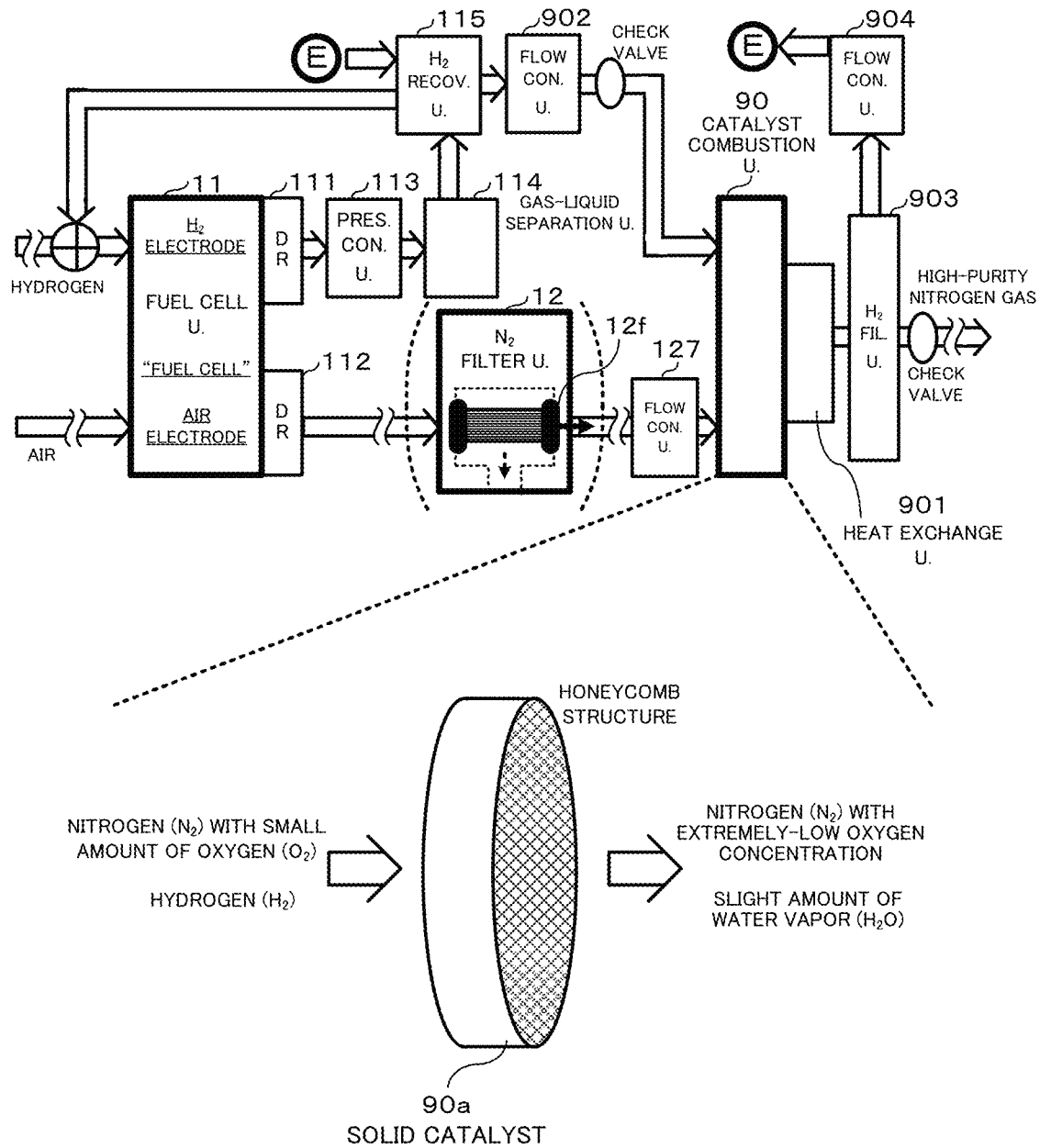
FIG. 9 is a schematic view illustrating another embodiment of the nitrogen gas generation apparatus/system according to the present invention.

FIG. 9 is a schematic view illustrating another embodiment of the nitrogen gas generation apparatus/system according to the present invention.

In the embodiment shown in FIG. 9, a catalyst combustion U (unit) 90 is provided behind the nitrogen filter U 12 (for example, at the immediate rear stage of the flow control U 127) in the nitrogen gas generation apparatus (system) 1 shown in FIG. 1. The catalyst combustion U 90 is a unit that brings a hydrogen gas and an oxygen content in the exhaust gas into contact with each other on a combustion catalyst composed of a precious metal compound such as palladium (Pd) and platinum (Pt) or other transition metal compound, and performs catalyst combustion which is an oxidation reaction that is more controlled than flame combustion.

Specifically, in the present embodiment, the catalyst combustion U 90 takes in
- (a) nitrogen gas having a low oxygen concentration (for example, an oxygen concentration of 0.1 to several vol %) extracted from the nitrogen filter U 12 and
- (b) hydrogen gas which is extracted from the outlet on the side of the hydrogen electrode of the fuel cell U 11, passed through the drain 111, the pressure control U 113 and the gas-liquid separation U 114, and then recovered by the hydrogen recovery U 115, which is then sent through a flow control U 902 and a check valve.

Then, the catalyst combustion U 90 brings these nitrogen gas and hydrogen gas into contact with each other on a surface of a solid catalyst 90a which is a combustion catalyst installed in the unit, causes a catalyst combustion reaction, and finally sends, to the outside, a high-purity nitrogen gas having an extremely-low oxygen concentration (for example, an oxygen concentration in order of 0.01 vol % (100 ppm vol)) as well as a slight amount of water vapor. Of course, in place of the hydrogen gas in the above (b) it is possible to supply hydrogen gas from, for example, the hydrogen generation U 102 and/or the fuel-reforming and hydrogen-generating U 103 to the catalyst combustion U 90.

The solid catalyst 90a which is a combustion catalyst installed in the catalyst combustion U 90 is preferably a ceramic honeycomb in which many fine holes are open, and a metal such as platinum (Pt) or palladium (Pd) is supported as a catalyst on the surface including the insides of the holes. As the solid catalyst 90a, for example, an NA honeycomb which is an oxidation catalyst (platinum catalyst, commercially available from Nagamine Manufacturing Co., Ltd.) can be used.

As shown in the catalog, the NA honeycomb is a solid catalyst in which platinum group metals such as platinum (Pt) and palladium (Pd) are supported on the surface of a carrier containing calcium-aluminate ($CaO \cdot Al_2O_3$), fused silica ($SiO_2$) and titanium dioxide ($TiO_2$) as main components. This carrier has a honeycomb shape, and the contact area of the platinum group metals supported thereon is very large, and thus an oxidation reaction is efficiently induced. Incidentally, the optimal operating temperature of the NA honeycomb is 200 to 850° C.

In the present embodiment, since hydrogen is combusted with a small amount of oxygen, the amount of its reaction heat is very small compared to general contact combustion. Therefore, the solid catalyst 90a is heated to, for example, 250° C., and used as a catalyst for contact combustion. The heating can be performed, for example, using an electric heating method in which a heating wire is wound around the solid catalyst 90a and current-carrying heating is performed.

In addition, as another preferable embodiment of the heating, induction heating may be performed on the solid catalyst 90a. Specifically, iron (Fe) or iron alloy such as stainless steel is mixed into the carrier of the solid catalyst 90a, a magnetic field (electromagnetic field) of, for example, several tens of kilohertz (kHz) to several hundreds of kHz is applied to the solid catalyst 90a using an electromagnetic field generating apparatus, and the solid catalyst 90a is directly heated with Joule's heat due to eddy current generated according to the principle of electromagnetic induction.

Here, according to the skin effect of electromagnetic induction, it is preferable to disperse an iron alloy such as stainless steel having a shape of dust, pieces, powder or flake near the surface of the carrier of the solid catalyst 90a, for example, at least in the inside portion of the carrier, the depth from the surface of which is equal to or larger than the penetration depth 5. Thereby, the portion to be a high temperature, which is near the surface of the solid catalyst 90a, can be heated to a predetermined high temperature with a uniform temperature distribution.

As an alternative, it is also possible to install a plate piece of iron or an iron alloy such as stainless steel, which is brought into contact with, for example, a side surface of the solid catalyst 90a, and perform induction heating on the solid catalyst 90a via the plate piece according to electromagnetic induction. In any case, in induction heating of the solid catalyst 90a, even if the plurality of solid catalysts 90a are used, a wiring such as winding heating wire is not required for each solid catalyst 90a, and the plurality of solid catalysts 90a can be heated at once and easily.

As described above, in the present embodiment, the solid catalyst 90a is heated in order to promote catalyst combustion. Here, in order to reduce electric power required for the heating, the oxygen concentration in the nitrogen gas extracted from the nitrogen filter U 12 can be set to be slightly larger. When the oxygen concentration is larger in this manner, the amount of heat generated during contact combustion increases, and electric power for heating the solid catalyst 90a can be reduced accordingly. In any case, in consideration of the purity and supply amount (flow rate) required for nitrogen gas to be finally supplied, it is important to appropriately adjust filtering conditions in the nitrogen filter U 12 (for example, the introduction flow rate of the exhaust gas) and catalyst combustion conditions (for example, the temperature of the solid catalyst 90a).

Here, nitrogen gas having an extremely-low oxygen concentration sent from the catalyst combustion U 90 comes out in a high temperature state, but the heat may be recovered by a plate type or multi-tube type heat exchanger 901 installed at the outlet of the catalyst combustion U 90. In this case, preferably, the heat recovered by the heat exchanger 901 is supplied to the off-gas buffer tank 123 in the same manner as the heat recovered from the fuel cell U 11, then, is used for increasing the temperature of the exhaust gas to be supplied to the nitrogen filter U 12 to a high value (for example, 45° C.), or is supplied to the outside. Here, when the temperature of the nitrogen gas output from the catalyst combustion U 90 is not so high, the gas may be sent to a hydrogen filter U 903 to be described below without passing through the heat exchanger 901.

The nitrogen gas having an extremely-low oxygen concentration output from the catalyst combustion U 90 also generally includes residual hydrogen gas that has not been combusted in the catalyst combustion reaction. In the present embodiment, the hydrogen filter U 903 takes in the high-purity nitrogen gas that has passed through a heat exchange U 901, and a known hydrogen gas filter installed therein separates residual hydrogen gas from the nitrogen gas having an extremely-low oxygen concentration and a higher-purity nitrogen gas is output. Then, the output high-purity nitrogen gas is preferably held and stored in the nitrogen tank 129 (FIG. 1) via a check valve, an oxygen concentration meter, a flow meter, and the booster U 128 (FIG. 1), and is appropriately provided to the outside.

Incidentally, as the hydrogen gas filter, a filter including, for example, a palladium (Pd)-based hydrogen permeable membrane may be used, or a hydrogen gas filter including an aromatic polyimide-based gas separation membrane may also be used. For example, UBE GAS SEPARATOR using a pipe in which hollow fiber membranes are bundled (commercially available from Ube Industries, Ltd.) and SEPURUN Noble (commercially available from Evonik) can be used.

In addition, in the present embodiment, the hydrogen gas separated from the nitrogen gas by the hydrogen filter U 903 is sent to the hydrogen recovery U 115 via a flow control U 904, then, may used again in the fuel cell U 11, or may be subjected to catalyst combustion again in the catalyst combustion U 90. Further, in the case that a reduction atmosphere is required at the nitrogen gas supply destination, for example, if the nitrogen gas supply destination is an antioxidant atmosphere furnace, a flyer or the like, it is possible to set the supplied nitrogen gas to contain a small amount of hydrogen while securing safety.

Further, as described above, when the catalyst combustion U 90 is used in the nitrogen gas generation apparatus (system) 1 (FIG. 1), it is possible to improve the recovery ratio in the nitrogen gas filter 12*f* (FIG. 1) of the nitrogen filter U 12. That is, considering that the oxygen concentration is finally set to a very low value in the catalyst combustion U 90, if the oxygen concentration of the gas output from the nitrogen gas filter 12*f* is set to be, for example, several vol %, it is possible to introduce an exhaust gas having a considerably large flow rate (outlet flow rate) in the nitrogen gas filter 12*f* (as can be seen from the graph of FIGS. 2A to 2C). As a result, the recovery ratio in the nitrogen gas filter 12*f* can be improved (as can be seen from the graph of FIGS. 5*a* to 5C).

Further, in the nitrogen gas generation apparatus (system) of the embodiment shown in FIG. 9, it is possible to efficiently generate nitrogen gas having a lower oxygen concentration only using the fuel cell U 11 and the catalyst combustion U 90, that is, without using the nitrogen filter U 12. In any case, it is understood that the combination of the "fuel cell" and "catalyst combustion" is very suitable in terms of sharing the required hydrogen gas and efficiently generating nitrogen gas.

Incidentally, although it is an embodiment that does not use the fuel cell, as an apparatus (system) that efficiently generates a high-purity nitrogen gas having a sufficiently reduced moisture or water vapor content, there can be used an apparatus (system) in which the fuel cell U 11 is omitted from the configuration of the apparatus (system) shown in FIG. 9, that is, which includes the nitrogen filter U 12 and the catalyst combustion U 90 as main components.

Another Embodiment of Fuel Cell

Figure 10:
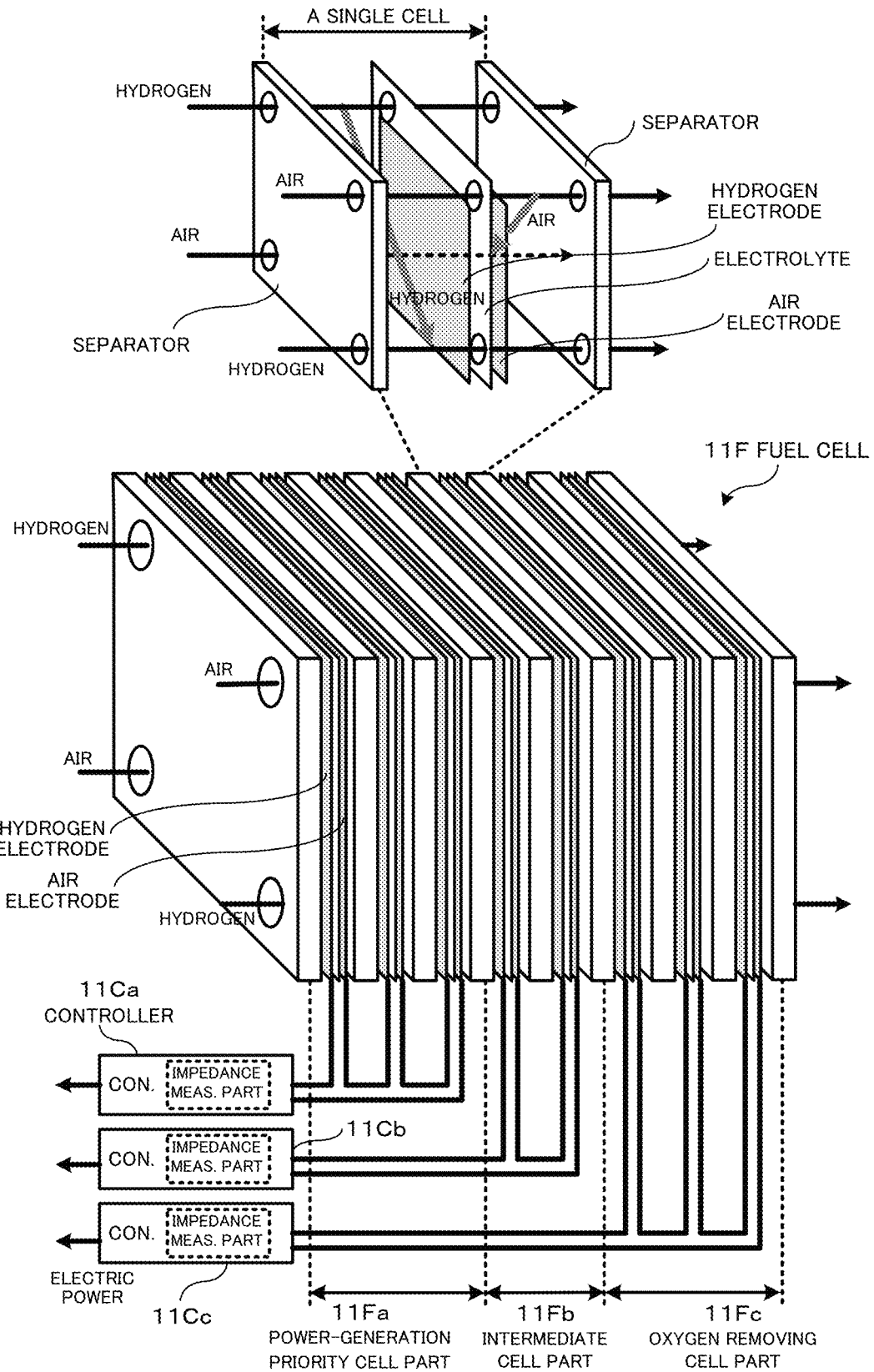
FIG. 10 is a schematic view illustrating another embodiment of the fuel cell according to the present invention.

FIG. 10 is a schematic view illustrating another embodiment of the "fuel cell" according to the present invention.

FIG. 10 shows a fuel cell 11F suitable as a "fuel cell" included in the fuel cell U 11 (FIG. 1). The fuel cell 11F includes a plurality of cells which are configuration units each including a hydrogen electrode and an air electrode with an electrolyte interposed therebetween, and is designed such that these cells are laminated so that hydrogen (fuel gas) and air (a gas containing nitrogen and oxygen) sequentially pass through the hydrogen electrodes in the cells and the air electrodes in the cells, respectively, in the order from an upper cell on the fuel supply side to a lower cells on the opposite side.

The entire cells are divided into a plurality of functional cell parts, specifically in FIG. 10, a power-generation priority cell part 11Fa, an intermediate cell part 11Fb, and an oxygen removing cell part 11Fc. Each of the functional cell parts (11Fa, 11Fb, and 11Fc) includes one cell or plural consecutive cells (in FIG. 10, two or three cells, actually, for example, several to several hundreds of cells), and is not electrically connected in series to other functional cell parts, but electrically connected to an individual controller (11Ca, 11Cb, 11Cc) that controls the amount of power generation.

As shown in FIG. 10, the controllers 11Ca, 11Cb and 11Cc receives an electromotive force generated between the hydrogen electrodes and the air electrodes in the power-generation priority cell part 11Fa, the intermediate cell part 11Fb, and the oxygen removing cell part 11Fc, respectively, and outputs electric power according to the corresponding functional cell part which the controller is in charge of. Further in this case, the controller preferably measures a complex impedance of the functional cell part which the controller is in charge of, and performs control/management according to the functional cell part.

On the other hand, conventional fuel cells, particularly PEFC type conventional fuel cells are composed of a series of, for example, hundreds of cells that are electrically connected in series in order to secure electric power required as an actual power source because an electromotive force in one cell is generally less than 1 V (volt). Here, of course, in a cell having a small oxygen supply amount, the amount of power that can be generated is small, but it is necessary to make the power generation amounts of individual cells connected in series uniform to some extent. Therefore, the power generation efficiency (with respect to the hydrogen supply amount) of all the connected-in-series cells including such a cell having a small oxygen supply amount is considerably impaired.

By contrast, in the fuel cell 11F,
(a) the power-generation priority cell part 11Fa having a large oxygen supply amount (in which not much oxygen in the supplied air has been consumed),
(b) the intermediate cell part 11Fb which is an intermediate with respect to the oxygen supply amount, and
(c) the oxygen removing cell part 11Fc having a small oxygen supply amount (a considerable amount of oxygen in the supplied air is consumed) can individually receive power generation amount controls suitable for the individual oxygen supply amounts. Therefore, it is possible to maximize or improve both the oxygen reduction efficiency and power generation efficiency (with respect to the hydrogen supply amount) in the fuel cell 11F by implementing such power generation amount controls.

In this manner, the fuel cell 11F is a very suitable fuel cell as a "fuel cell" of the fuel cell U 11 (FIG. 1), that is, for generating a high-purity nitrogen gas. Of course, the fuel cell 11F can also be used for other general objects as a suitable fuel cell that can optimize power generation efficiency.

Incidentally, the number of functional cell parts in the fuel cell 11F is not limited to three, and may be two or four or more. For example, among hundreds of cells, the lower 150-stage cell group and the remaining upper cell group can be used as the first functional cell part and the second functional cell part, respectively.

As described above in detail, according to the present invention, it is possible to generate a high-purity nitrogen gas reliably and stably using the fuel cell. In particular, in the case that a dehumidifying treatment is performed on the exhaust gas from the fuel cell using a water seal pump or a dry filter, and additionally, a nitrogen gas filter and also catalyst combustion are used, it is possible to generate a higher-purity nitrogen gas more reliably, more stably and efficiently.

Further in the future, when the hydrogen gas society/carbon zero society appears, the use of fuel cells using hydrogen gas as a fuel gas is expected to become very widespread everywhere. The present invention will greatly contribute to efficient nitrogen gas production in such an era. Of course, the present invention will also make it possible to respond to the need of supplying electric power and heat and in some cases, pure water, on the spot. That is, it is considered that the present invention will greatly contribute to construction of a locally-produced and locally-consumed carbon zero energy/product demand-supply system, which is considered to be an of ideal form for the future.

Further according to the present invention, although it is only one embodiment of the present invention, it is also possible to supply hydrogen gas as a fuel gas to the fuel cell using the hydrogen generation U including an electrolysis part. It is also considered that such a configuration will be greatly utilized in the hydrogen gas society/carbon zero society described above.

Many widely different alternations and modifications of the above-described various embodiments of the present invention may be constructed without departing from the spirit and scope of the present invention. All the foregoing embodiments are by way of example of the present invention only and not intended to be limiting. Accordingly, the present invention is limited only as defined in the following claims and equivalents thereto.

REFERENCE SIGNS LIST 1 nitrogen gas generation apparatus/system; 101 natural energy power generation U (unit); 101s the power storage U; 102 the hydrogen generation U; 103 the fuel-reforming and hydrogen-generating U; 104 the hydrogen tank; 105, 109, 127, 902, 904 flow control U; 106 the air compression U; 107 the air tank; 108 filter U; 11 fuel cell U; 11Ca, 11Cb, 11Cc controller; 11F fuel cell; 11Fa power-generation priority cell part; 11Fb intermediate cell part; 11Fc oxygen removing cell part; 111, 112 drain; 113, 121 pressure control U; 114, 122 gas-liquid separation U; 115 hydrogen recovery U; 12 nitrogen filter U; 12f, 12f1, 12f2, 12f3 nitrogen gas filter; 122f dry filter; 112f1 mesh tube; 122f2 drain; 123 off-gas buffer tank; 124, 128 booster U; 125 corrosive gas etc. removal U; 126 temperature control U; 129 nitrogen tank; 131 total control U; 30 water seal pump U; 301 water seal pump; 302 gas-liquid separation tank; 40, 60, 901 heat exchange U; 50 adiabatic expansion chamber; 501 tube bundle; 90 catalyst combustion U; 90a solid catalyst; and 903 hydrogen filter U.

The invention claimed is:

1. A nitrogen gas generation apparatus comprising:
a fuel cell configured to operate by taking in air or a gas containing nitrogen and oxygen, and a fuel gas;
a gas compressor configured to increase a pressure of the air or the gas containing nitrogen and oxygen, which is applied to the fuel cell;
a dehumidification mechanism configured to reduce moisture or water vapor content in an exhaust gas that is extracted from the fuel cell and has a lower oxygen concentration than air;
a filtering mechanism including a filter using fibers having different degrees of permeation for nitrogen and oxygen and configured to convert the exhaust gas having a reduced moisture or water vapor content into a nitrogen-enriched gas having an increased nitrogen concentration;
a pressure controller configured to control pressures in a high-pressure combination including a series of the fuel cell, the dehumidification mechanism and the filtering mechanism; and
a total control unit configured to:
cause the pressure controller to set a pressure of the exhaust gas having a reduced moisture or water vapor content, which is applied to the filtering mechanism, to a value exceeding a filter pressure threshold determined depending on a flow rate and an oxygen concentration of the nitrogen-enriched gas extracted from the filter; and
cause the pressure controller to set a pressure of the air or the gas containing nitrogen and oxygen, which is applied to the fuel cell, to a pressure value determined in conjunction with the value exceeding the pressure threshold,
wherein the apparatus thus enables to supply the nitrogen-enriched gas having a desired or required low oxygen concentration from the high-pressure combination.

2. The nitrogen gas generation apparatus as claimed in claim 1, wherein the filter is a filter in which a recovery ratio is higher when an oxygen concentration of a gas to be filtered is lower.

3. A nitrogen gas generation apparatus comprising:
a fuel cell configured to operate by taking in air or a gas containing nitrogen and oxygen, and a fuel gas;
a dehumidification mechanism configured to reduce moisture or water vapor content in an exhaust gas that is extracted from the fuel cell and has a lower oxygen concentration than air;
a filtering mechanism including a filter using fibers having different degrees of permeation for nitrogen and oxygen and configured to convert the exhaust gas having a reduced moisture or water vapor content into a gas having an increased nitrogen concentration; and a gas return flow path in which a filter exhaust gas, which is a gas containing a gas that has permeated the fibers and is a gas different from the nitrogen-enriched gas having an increased nitrogen concentration, is extracted from the filter to which the exhaust gas is applied, and the extracted filter exhaust gas is added to the air or the gas containing nitrogen and oxygen to be supplied to the fuel cell and is used in the fuel cell, and/or is added to the exhaust gas to be supplied to the filtering mechanism and is used in the filtering mechanism.

4. The nitrogen gas generation apparatus as claimed in claim 1, wherein the filtering mechanism includes a plurality of the filters arranged parallel to each other and each of the filters acts on an amount of the supplied exhaust gas which the each of the filters takes in.

5. The nitrogen gas generation apparatus as claimed in claim 1, wherein the dehumidification mechanism is a pump unit including a water seal pump.

6. The nitrogen gas generation apparatus as claimed in claim 5, further comprising a heat exchanger configured to receive heat from a sealing liquid of the pump unit and the fuel cell and adjusts temperature of the sealing liquid and the fuel cell.

7. The nitrogen gas generation apparatus as claimed in claim 5, further comprising an adiabatic expansion chamber in which the exhaust gas extracted from the fuel cell expands adiabatically,
wherein the pump unit takes in the adiabatically expanded exhaust gas and reduces moisture or water vapor content in the exhaust gas.

8. The nitrogen gas generation apparatus as claimed in claim 7, further comprising a heat exchanger configured to receive heat from a sealing liquid of the pump unit and the fuel cell, transfer the heat to the adiabatic expansion chamber, and adjust temperature of the sealing liquid, the adiabatic expansion chamber and the fuel cell.

9. The nitrogen gas generation apparatus as claimed in claim 8, further comprising a pure water recovery mechanism configured to provide high-purity water extracted from the fuel cell, the adiabatic expansion chamber, and/or the pump unit.

10. The nitrogen gas generation apparatus as claimed in claim 1, further comprising a catalyst combustion mechanism configured to cause the nitrogen-enriched gas having an increased nitrogen concentration extracted from the filter to react with the fuel gas on a combustion catalyst, and convert the nitrogen-enriched gas having an increased nitrogen concentration into a gas having a lower oxygen concentration.

11. The nitrogen gas generation apparatus as claimed in claim 10, wherein the catalyst combustion mechanism causes the nitrogen-enriched gas having an increased nitrogen concentration to react with the fuel gas on the combustion catalyst heated by electromagnetic induction.

12. The nitrogen gas generation apparatus as claimed in claim 1, wherein the fuel cell includes a plurality of cells which are configuration units each including two electrodes with an electrolyte interposed therebetween, all of the plurality of cells being divided into a plurality of functional cell parts, each of which includes one cell or plural consecutive cells and is not electrically connected in series to other functional cell parts, but electrically connected to an individual controller that controls the amount of power generation.

13. A nitrogen gas generation system comprising:
   a fuel cell configured to operate by taking in air or a gas containing nitrogen and oxygen, and a fuel gas;
   a gas compressor configured to increase a pressure of the air or the gas containing nitrogen and oxygen, which is applied to the fuel cell;
   a dehumidification mechanism configured to reduce a moisture or water vapor content in an exhaust gas that is extracted from the fuel cell and has a lower oxygen concentration than air;
   a filtering mechanism including a filter using fibers having different degrees of permeation for nitrogen and oxygen and configured to convert the exhaust gas having a reduced moisture or water vapor content into a nitrogen-enriched gas having an increased nitrogen concentration;
   a pressure controller configured to control pressures in a high-pressure combination including a series of the fuel cell, the dehumidification mechanism and the filtering mechanism; and
   a total control unit configured to:
      cause the pressure controller to set a pressure of the exhaust gas having a reduced moisture or water vapor content, which is applied to the filtering mechanism, to a value exceeding a filter pressure threshold determined depending on a flow rate and an oxygen concentration of the nitrogen-enriched gas extracted from the filter; and
      cause the pressure controller to set a pressure of the air or the gas containing nitrogen and oxygen, which is applied to the fuel cell, to a pressure value determined in conjunction with the value exceeding the pressure threshold,
      wherein the system thus enables to supply the nitrogen-enriched gas having a desired or required low oxygen concentration from the high-pressure combination.

14. The nitrogen gas generation apparatus as claimed in claim 1,
   wherein the dehumidification mechanism is a dry filter unit including a hollow fiber filter, and
   wherein the total control unit is configured to cause the pressure controller to set a pressure of the exhaust gas extracted from the fuel cell, which is applied to the dry filter unit, to a pressure value determined from a value required because of use of the hollow fiber filter.

* * * * *